(12) United States Patent
Menjak et al.

(10) Patent No.: US 6,997,076 B2
(45) Date of Patent: Feb. 14, 2006

(54) GEAR BACKLASH ELIMINATION AND ADJUSTABLE GEAR BACKLASH MECHANISM

(75) Inventors: Ratko Menjak, Frankenmuth, MI (US); Damir Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 239 days.

(21) Appl. No.: 10/364,021

(22) Filed: Feb. 10, 2003

(65) Prior Publication Data

US 2004/0154422 A1    Aug. 12, 2004

(51) Int. Cl.
    *F16H 55/18*    (2006.01)
(52) U.S. Cl. .......................... 74/409; 74/492
(58) Field of Classification Search ........ 74/409, 74/440, 492
    See application file for complete search history.

(56) References Cited

U.S. PATENT DOCUMENTS

| | | | |
|---|---|---|---|
| 3,548,673 A | * 12/1970 | Suchocki | 74/409 |
| 4,369,668 A | * 1/1983 | Pollak-Banda et al. | 74/414 |
| 4,912,998 A | 4/1990 | Sugano et al. | 74/409 |
| 5,092,190 A | * 3/1992 | Kubo et al. | 74/410 |
| 6,454,044 B1 | 9/2002 | Menjak et al. | 180/444 |

FOREIGN PATENT DOCUMENTS

| | | | |
|---|---|---|---|
| EP | 0 426 678 B1 | | 1/1993 |
| GB | 2 125 927 | * | 3/1984 |
| JP | 60-157561 | * | 8/1985 |
| JP | 3-37466 | * | 2/1991 |
| JP | 3-66971 | * | 3/1991 |
| JP | 6-257660 | * | 9/1994 |
| JP | 9-112665 | * | 5/1997 |

* cited by examiner

*Primary Examiner*—William C Joyce
(74) *Attorney, Agent, or Firm*—Michael D. Smith

(57) ABSTRACT

The gear mechanism for minimizing backlash may include a convoluted spring positioned between an external spline of a gear or shaft and an internal spline of a gear. The gear mechanism may include a cam and cam follower arrangement upon two adjacent gears positioned on the same shaft. Two stacked gears may include a U-shaped backlash eliminating element passing through both gears. The gear mechanism may include rollers which may be conically shaped.

23 Claims, 18 Drawing Sheets

GEAR BACKLASH ELIMINATION AND ADJUSTABLE GEAR BACKLASH MECHANISM

TECHNICAL FIELD

This invention relates to elimination of backlash between gears, and more particularly, to elimination of backlash between the meshed gearing in an active control steering system, and apparatus for stationary wheel hub.

BACKGROUND OF THE INVENTION

Backlash is the clearance between adjacent gear teeth. More specifically, backlash is the clearance around a tooth of a driver gear as it fills the space between two teeth of a driven gear. Backlash is defined as the rotational arc clearance between a pair of mounted gears. Some amount of backlash (clearance) is necessary in order to permit relative motion between the two gears and to prevent damage from interference. Lack of backlash may cause noise, overloading, overheating of gears, and even seizing and failure. Gears without backlash will not work if temperature rises. In a gear system with no backlash, the meshing of the teeth between the gears will be so tight that, absent any deflection of the teeth, the gears will bind and cause the system to jam.

In a gear system with any degree of backlash, an audible noise known as "lash" is produced by the contact of the teeth of one gear with the teeth of another gear. While lash is not indicative of a defect in the gearing system, it often proves to be an annoyance and it is therefore desired to be minimized as much as practicable. Backlash is a reality in any gear transmission. In every steering system, eliminating backlash is very important, especially in active front control steering systems. Backlash is the sum of the free play between every set of meshing components. Steering systems with backlash have bad feeling at directional changes. At the same time, backlash is lost motion. Furthermore, wear increases backlash over time.

SUMMARY OF THE INVENTION

The above discussed and other drawbacks and deficiencies of the prior art are overcome or alleviated by a gear mechanism for minimizing backlash. In an exemplary embodiment of the invention, the gear mechanism includes an external gear having an internal spline, an internal gear positioned within the external gear, the internal gear having an external spline, and a convoluted spring positioned between the internal spline of the external gear and the external spline of the internal gear.

In another exemplary embodiment of the invention, a gear mechanism for minimizing backlash includes a first shaft having a longitudinal axis, a first gear positioned on the shaft, a second gear positioned on the shaft, a cam positioned on a face of the first gear, and a cam follower positioned on a face of the second gear, wherein the cam engages with the cam follower.

In another exemplary embodiment of the invention, a gear mechanism for minimizing backlash includes a shaft, a first gear positioned on the shaft, a second gear positioned on the shaft and adjacent the first gear, and a U-shaped backlash eliminating element passing through both the first gear and the second gear.

In another exemplary embodiment of the invention, a gear transmission for minimizing backlash includes a first shaft, a first roller positioned on the first shaft, a first gear positioned on the first shaft, a second shaft, a second roller positioned on the second shaft and adjacent the first roller, and a second gear positioned on the second shaft and adjacent the first gear, wherein the first roller and the second roller abut when teeth of the first gear mesh with teeth of the second gear.

The above discussed and other features and advantages will be appreciated and understood by those skilled in the art from the following detailed description and drawings.

BRIEF DESCRIPTION OF THE DRAWINGS

The present invention will now be described, by way of example, with reference to the accompanying drawings, in which.

DESCRIPTION OF THE PREFERRED EMBODIMENTS

This system has elimination of backlash with mechanical solutions for providing a good feeling for a driver at a steering wheel and other advantages for gear transmission without backlash. This system provides backlash elimination for active front control steering system with gear transmissions. This backlash elimination can be applied at all other gear transmissions.

Elastic members eliminate backlash, produce good feeling to the driver and do not have lost motion for steering system. Elastic members permit deflections. This system has a dynamic method for controlling backlash. One embodiment of backlash removal is by forced tooth contact.

Figure 1:
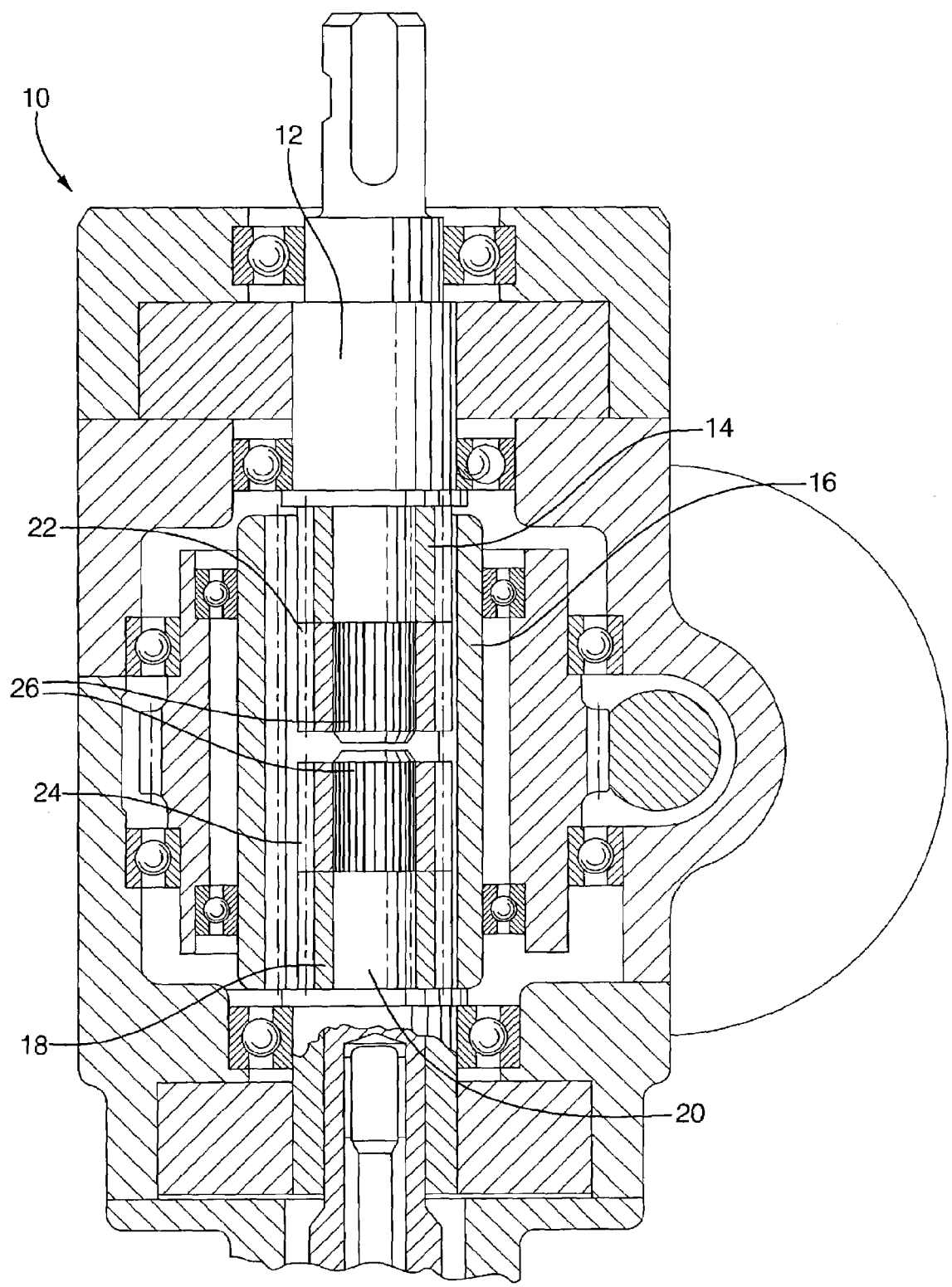
FIG. 1 is a cross-sectional view of a steering mechanism.

FIG. 1 shows an active frontal control steering mechanism 10 with elimination of backlash. Rotation of mechanism 10 includes transmission from upper shaft 12, gear 14, internal gear 16, gear 18, to lower shaft 20. Gears 14 and 18 have backlash elimination. Gears 22 and 24 have spline and springs 26. Gear 22 and 24 over springs 26 make elimination of backlash. Backlash removal is by gear 22, gear 24, and spring 26 that insure teeth contacts with gear 16 in both directions.

Figure 2:
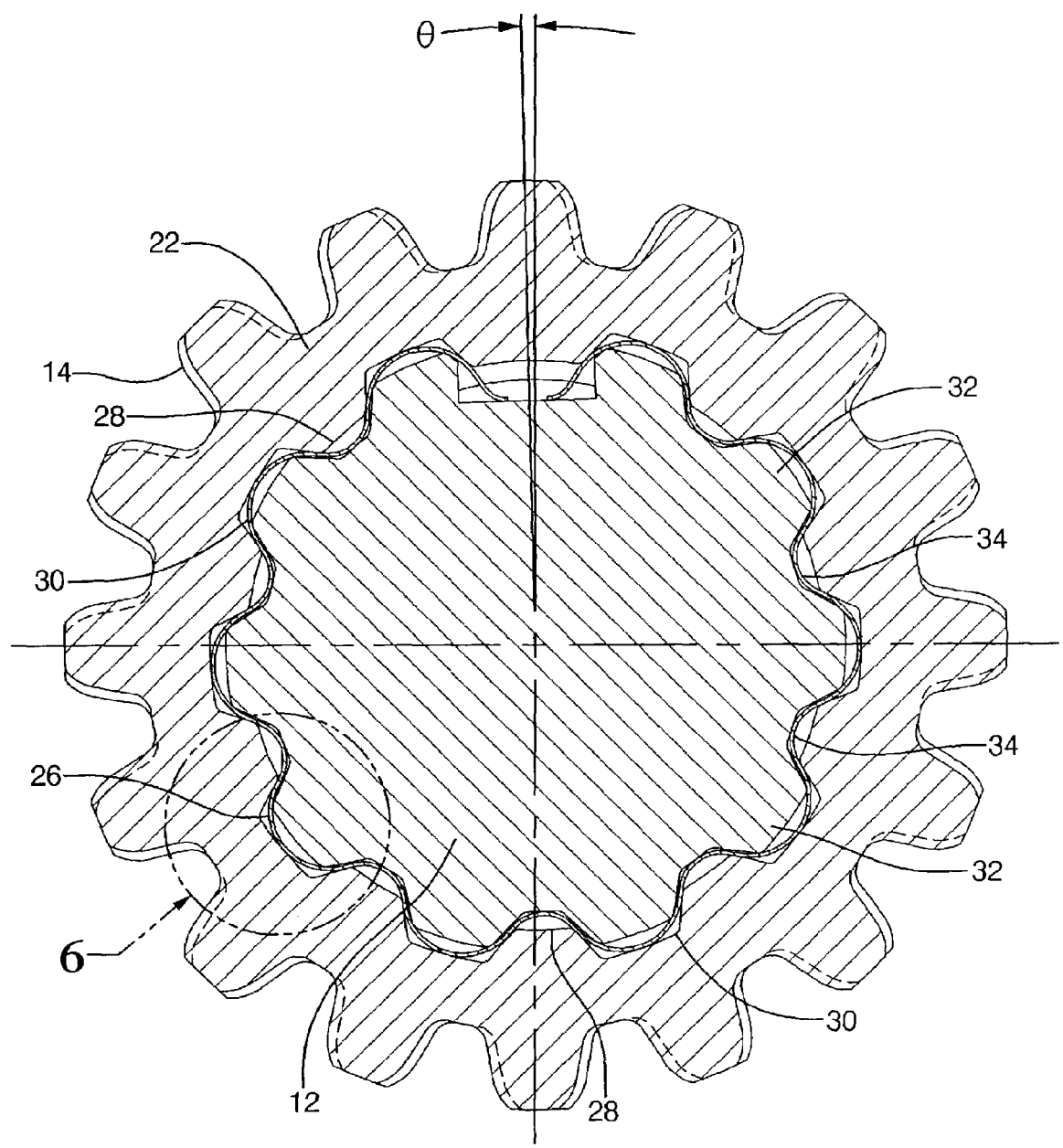
FIG. 2 is a cross-sectional view of a shaft, gears, and a spring within the steering mechanism of FIG. 1.

FIG. 2 shows a section through upper shaft 12, gear 14, and spring 26, of the mechanism 10 of FIG. 1. Gear 22 has an internal spline having teeth 28 which protrude inwardly and which are separated by grooves or indents 30. The teeth 28 and indents 30 may have similar cross-sectional shapes including trapezoidal shapes where each tooth 28 and an adjacent indent 30 share one side. Upper shaft 12 has an external spline in the area under gear 22. The upper shaft 12 may include teeth 32 which protrude outwardly and which are separated by indents 34. Similar to the teeth 28 and indents 30, the teeth 32 and indents 34 may have trapezoidal cross-sectional shapes. As can be seen in FIG. 2, teeth 32 of upper shaft 12 are sized to fit within grooves 30 of gear 22 and teeth 28 of gear 22 are sized to fit within grooves 34 of upper shaft 12. Ten teeth splines engaging between upper shaft 12 and gear 22 are shown, although it is within the scope of the mechanism 10 to include more or less cooperating teeth and grooves as deemed necessary. Between these ten teeth splines is a spring 26 which insures teeth contact for load transmission and permits deflection at greater forces. The spring 26 may have a convoluted or corrugated annular shape as shown. Teeth position of gear 22 and gear 14 are moved for angle θ=backlash of gears in mesh. At installation with internal gear 16, shown in FIG. 1, spring 26 retains teeth of gears 22 and 14 in touch with teeth of internal gear 16. Teeth of gear 22 are in contact with teeth of gear 16 at one side. Teeth of gear 14 are in contact with teeth of gear 16 at another side. Backlash between gears 14 and 16 and gears 16 and 18 needs to be eliminated. Gears 14 and 22 make scissors over spring 16 which insures contact for regular torque transmission. Teeth of gear 14 are in contact with teeth of gear 16. Teeth of gear 22 are in contact with teeth of gear 16 at a different location along the longitudinal axis of upper shaft 12, which shares a longitudinal axis with lower shaft 20. Rotation in both directions should thus be without backlash. The spring 26 permits deflection for avoiding possible higher resistance of gear rotation. Both gears 14 and 22 are in contact with gear 16. Likewise, gears 18 and 24 make scissors and are in mesh with gear 16 at different locations along the longitudinal axis of lower shaft 20. The spring force in this example is F=F1+F2 where F1 is transmission load on tooth surface and F2 is friction force on tooth surface. Backlash is removed by forced tooth contact. Backlash removal by forces center distance closing. That is, centerlines between gears 14 and 16 can be a little offset over spring 26. Teeth have contacts at both sides. Spring 26 permits deflection for higher resistance of gear rotation. It is possible to combine the two dynamic methods for removing backlash.

Figure 3:
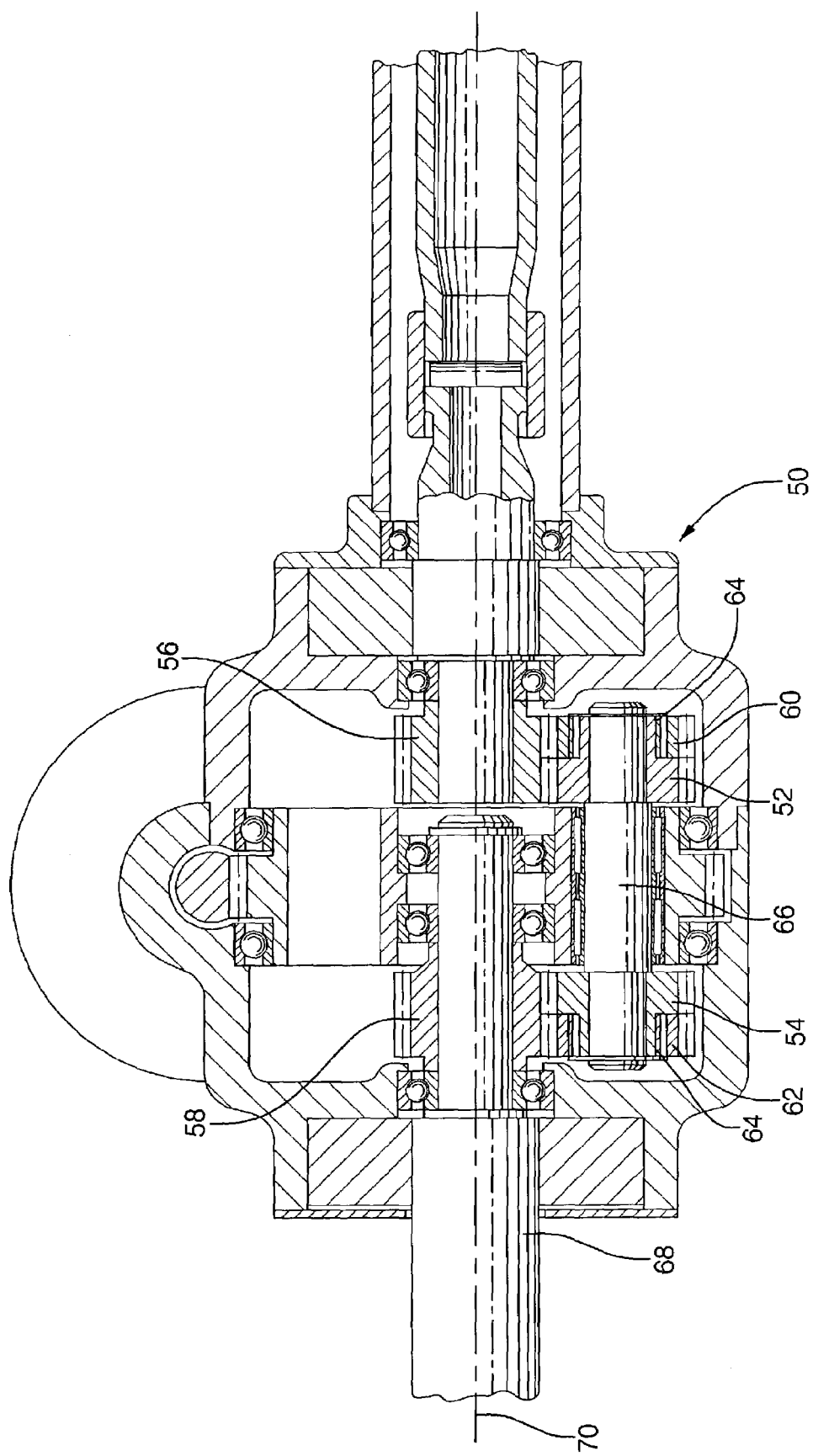
FIG. 3 is a cross-sectional view of a steering mechanism using planetary gears.

FIG. 3 shows active front control steering mechanism 50 with elimination of backlash. This mechanism has planetary gears 52 and 54 positioned about shaft 66. Gear 52 is in mesh with gear 56 and gear 54 is in mesh with gear 58, where gears 56 and 58 are positioned about the same longitudinal axis 70 shared by shaft 68. Eliminations of backlash are over gears 60 and 62 and springs 64. Between gears 60 and 52 with splines is spring 64. As further shown in FIG. 3, planetary gears 52 and 54 have two different exterior outer peripheries with differing outermost diameters, a first outer periphery having an outermost diameter which is preferably substantially the same as the outermost diameter of the gears 60 and 62, and a second outer periphery which is containable within the inner periphery of gears 60 and 62.

Figure 4:
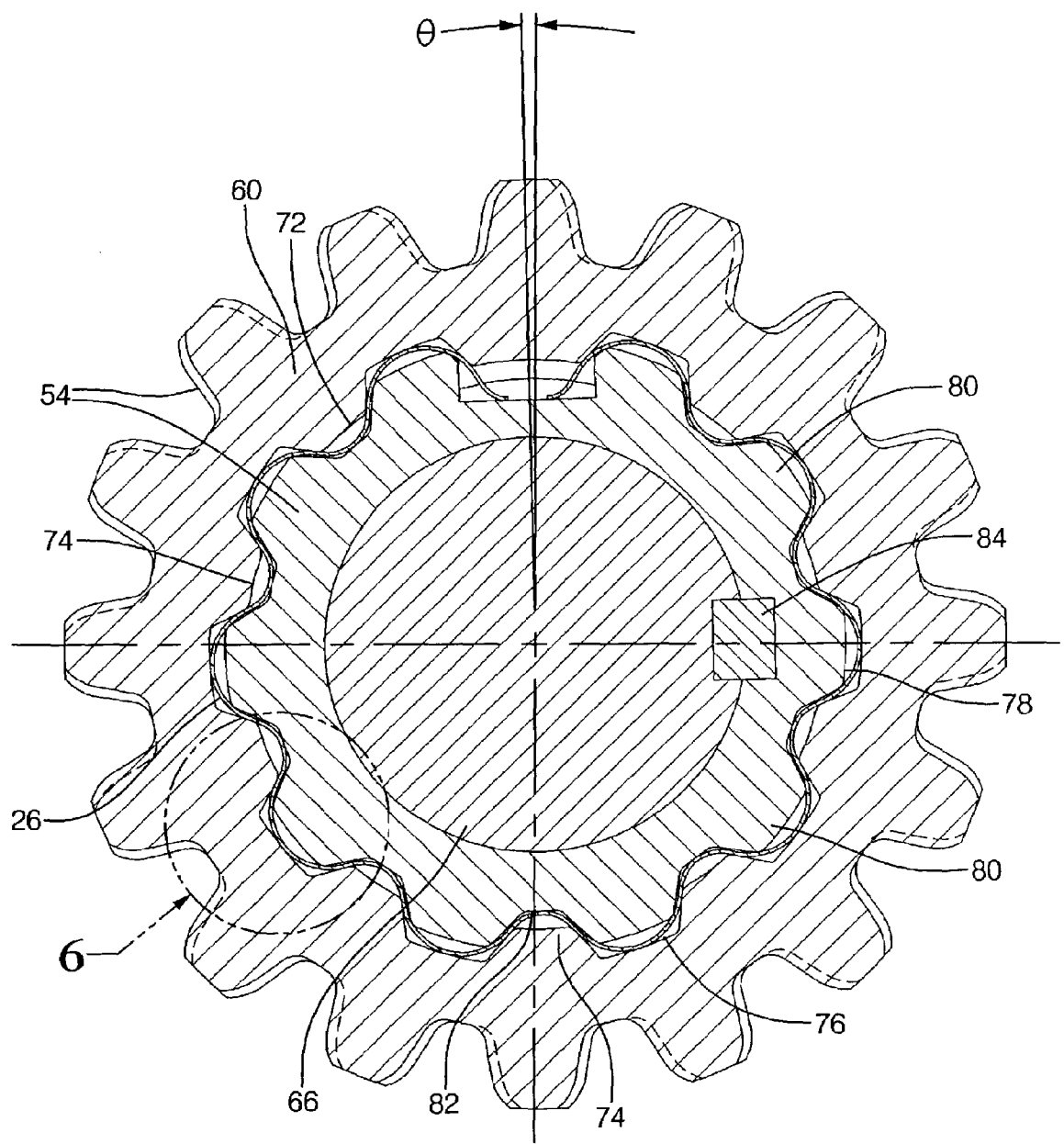
FIG. 4 is a cross-sectional view of a shaft, gears, and a spring within the steering mechanism of FIG. 3.

FIG. 4 shows section through gear 60, gear 52, and spring 64 from FIG. 3. Gear 52 and shaft 66 are held together by key 84, which may be a regular key between gear and shaft. Gear 60 has an internal spline 72 having teeth 74 which protrude inwardly towards the center of shaft 66 and which are separated by grooves or indents 76. The teeth 74 and indents 76 may have similar cross-sectional shapes including trapezoidal shapes where each tooth 74 and an adjacent indent 76 share one side. Gear 52 has an external spline 78 in the area of the second outer periphery. The external spline 78 may include teeth 80 which protrude outwardly and which are separated by indents 82. Similar to the teeth 74 and indents 76, the teeth 80 and indents 82 may have trapezoidal cross-sectional shapes. As can be seen in FIG. 4, teeth 80 of gear 52 are sized to fit within grooves 76 of gear 60 and teeth 74 of gear 60 are sized to fit within grooves 82 of gear 52. Between the splines 72 and 78 is spring 64 which insures constant teeth contact for load transmission and permits deflection at greater forces. Position of teeth of gear 60 and gear 52 are moved for angle θ which is same or higher than angular backlash of gears in mesh. At installation, gear 60 with gear 52 has spring 64, the assembly of which, in turn, is in mesh with gear 56 as shown in FIG. 3. Teeth of gear 60 are in contact with teeth of gear 56 at one side. Teeth of gear 52 are in contact with gear 56 over teeth at another side. Thus, this embodiment eliminates backlash.

Figure 5:
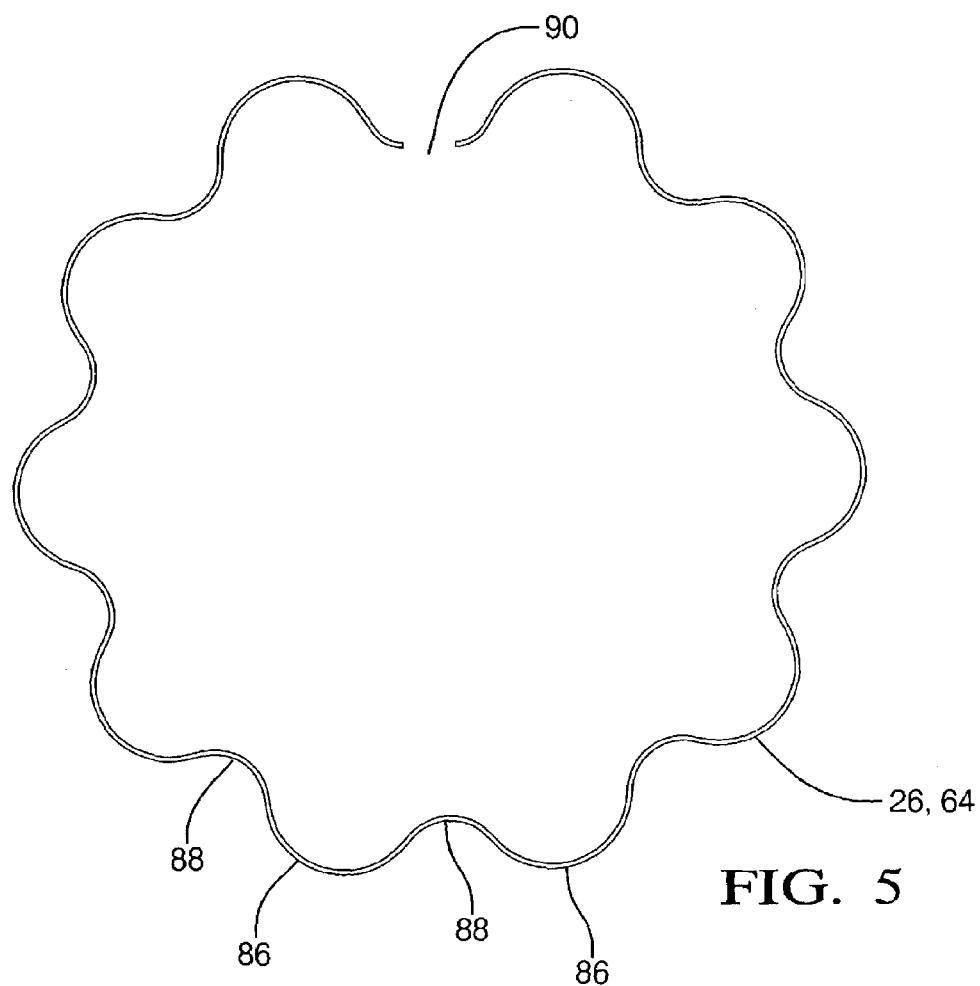
FIG. 5 is a cross-sectional view of a spring for use in the steering mechanisms of FIGS. 1 and 3.

FIG. 5 shows spring 26 and 64 from FIGS. 2 and 4. The spring 26, 64 can have different characteristics and dimensions depending on gear dimension, amount of backlash and transmission load. In the embodiment shown, however, the spring 26, 64 is a generally annular shaped corrugated ring including intermittent rounded protrusions 86 and grooves 88. The ring may include an interruption 90 which breaks one of the grooves 88. Although alternate configurations are possible, for the ten spline spring 26, 64 shown, the peak to peak distance from one protrusion 86 to the next may cover approximately 35 degrees while the peak to peak distance from the adjacent protrusions 86 which surround the interruption 90 may be 45 degrees. It should also be noted that the innermost points of the grooves 88 define an innermost radius of the spring 26, 64 and the peaks of the protrusions 86 define an outermost radius of the spring 26, 64.

Figure 6:
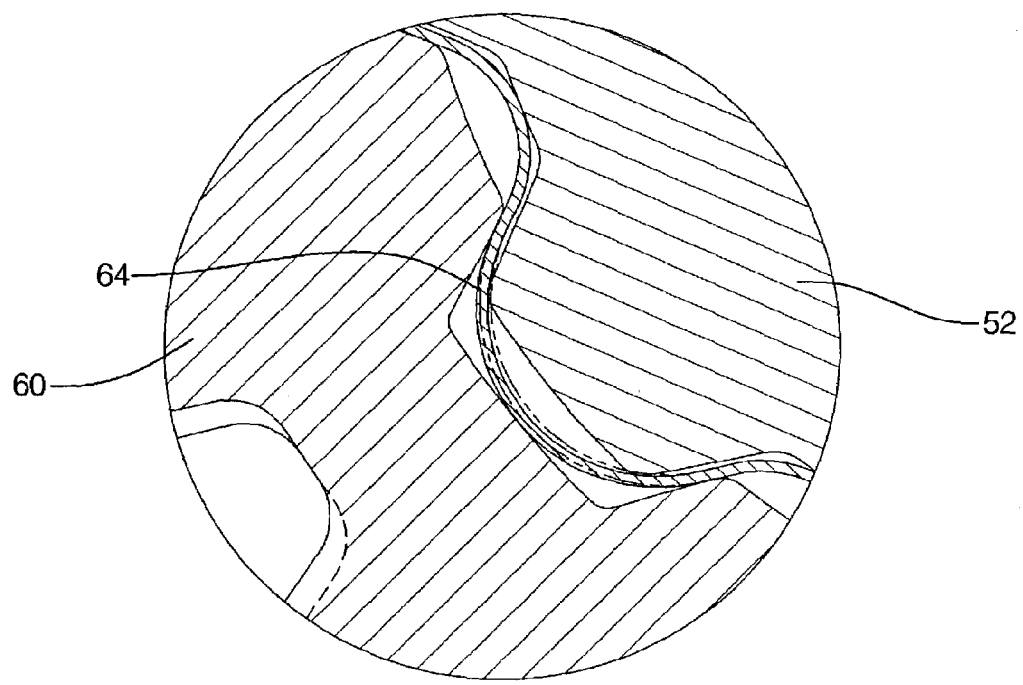
FIG. 6 is an enlarged view of area B from FIG. 4.

FIG. 6 shows view in circle B from FIG. 4, although circle B from FIG. 2 would be the same. Between spline of gears 60 and 52 is spring 64 with preload for avoiding any backlash between splines. After installation this spring 64 has possibility for additional deflection. This preload holds gears in mesh without backlash over position of teeth with angle θ. Spring deflection permits relative movement between gears for adjustment.

Figure 7:
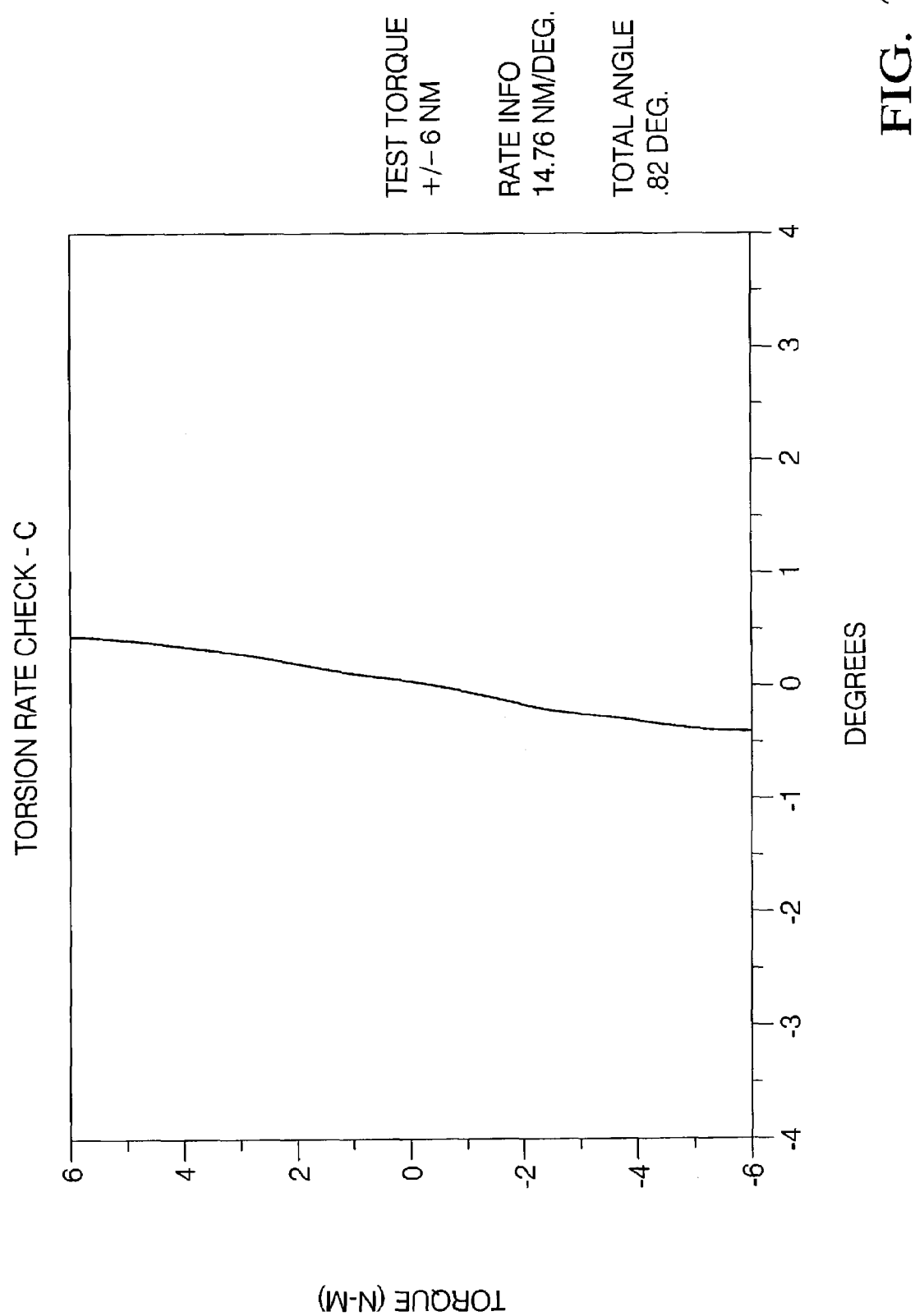
FIG. 7 is a chart demonstrating test results using the spring and steering mechanisms of FIGS. 1–6.

FIG. 7 shows result from TEST TORQUE of presented spring 26, 64 and splines described above with respect to FIGS. 1–6. This test was for steering torque +/−6 Nm. Diagram shows that rotations with changes in direction are without backlash. This means that spring 26, 64 holds teeth of gears in contact without backlash. Same diagram shows possibility for spring deflection. Presented solutions are with 10 teeth spline. For different transmission load and different backlash can be used gears with different number of teeth spline and likewise spring will have different characteristic and different dimensions.

Figure 8:
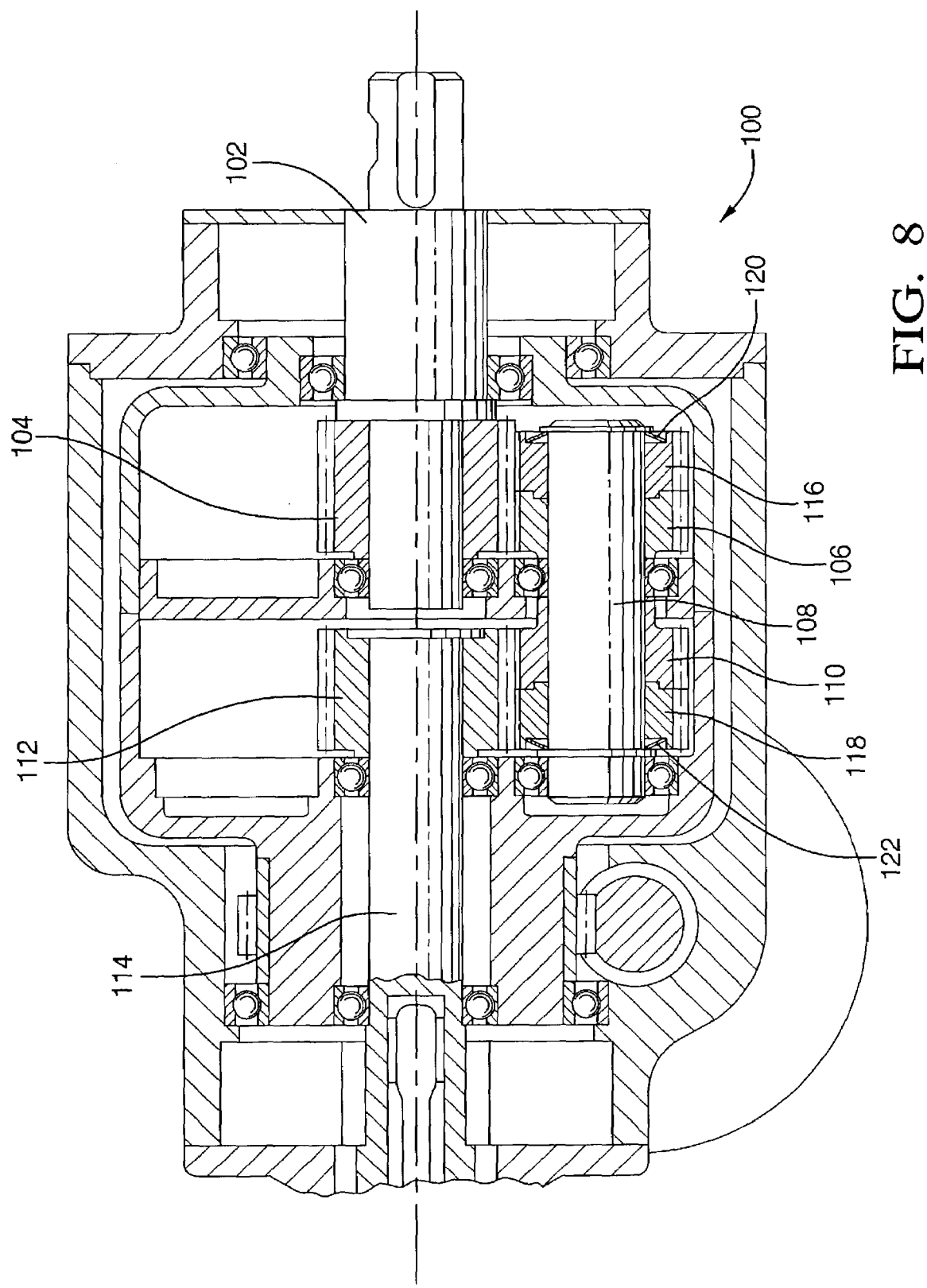
FIG. 8 is a cross-sectional view of a gear assembly.

FIG. 8 shows a gear assembly 100 with backlash elimination using a cam and follower solution. Upper shaft 102 rotates gear 104 and gear 106. Gear 106 is positioned on shaft 108. Gear 110 is also positioned on shaft 108. Gear 110 rotates gear 112 and lower shaft 114. Backlash between gears 104 and 106, and between gears 110 and 112 need to be eliminated. On shaft 108 are gears 116 and 118. Gear 116 has same teeth arrangement as gear 106. Face of gear 116 has shape with cams while gear 106 has face with followers, as will be further described with respect to FIG. 9B. At this position teeth of gear 106 and gear 116 are in contact with gear 104. Spring 120 is preloaded with possibility for additional deflection. Gear 116 eliminates backlash. Over cam and follower shapes, gear 116 can have small axial movement. Gear 116 may move axially toward spring 120. Spring 120 permits this movement over its deflection. Backlash elimination is identical between gears 110 and 112 over spring 122.

Figure 9:
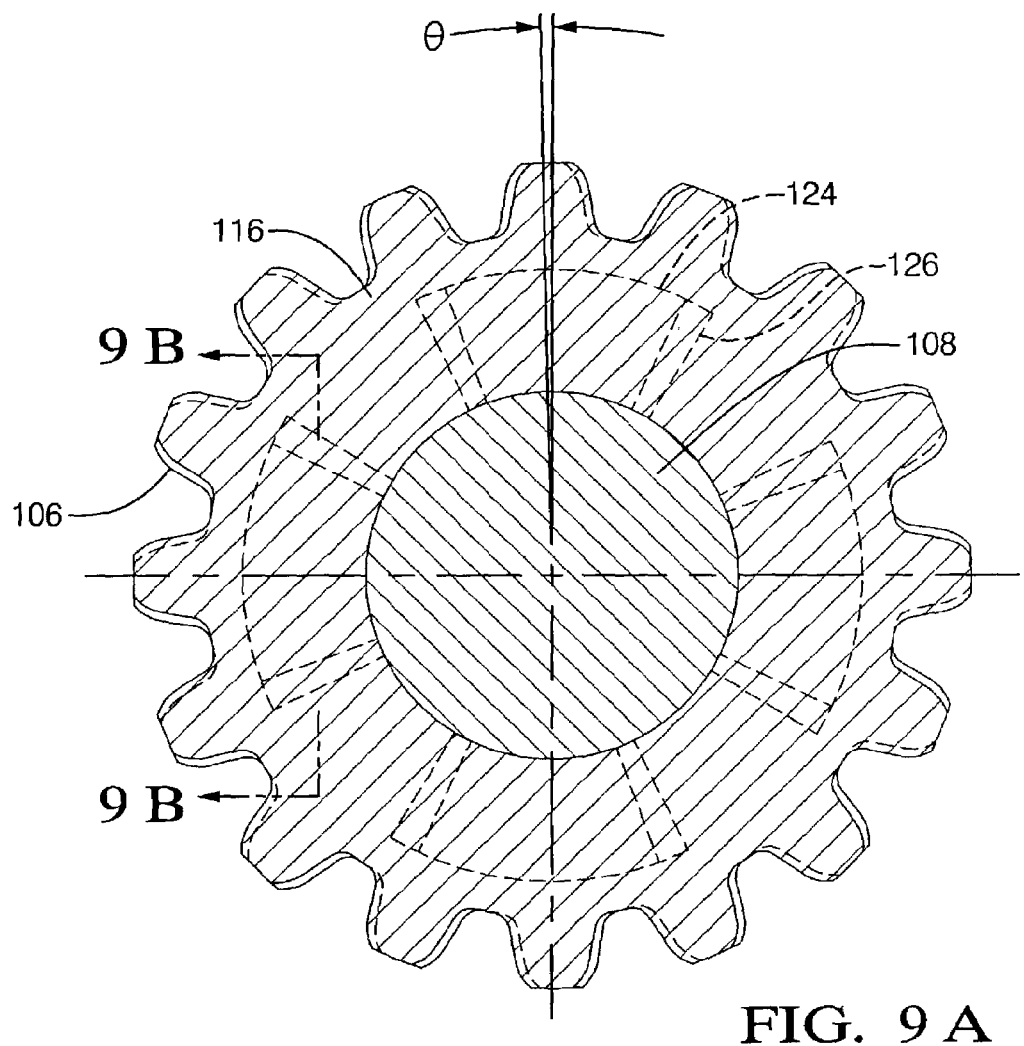
FIG. 9A is a cross-sectional view of gears used in the gear assembly of FIG. 8.
FIG. 9B is a cross-sectional view taken along line B—B in FIG. 9A.
Figure 9:
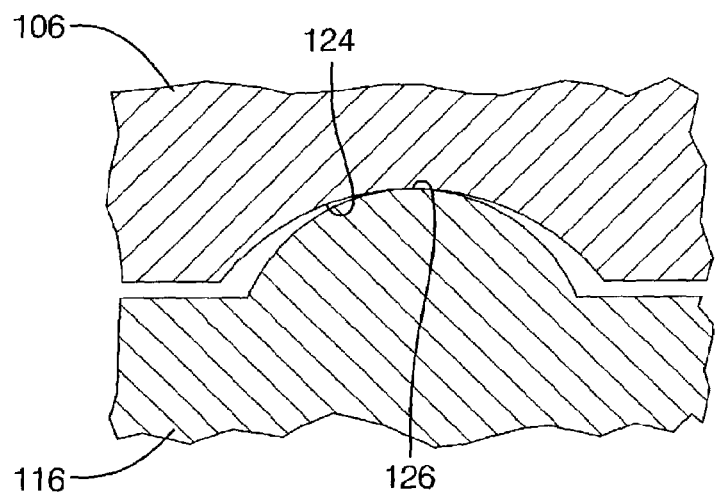

FIG. 9A shows cross-section through gear 116 and shaft 108 from FIG. 8. Angle θ shows teeth positions at relationship with centerlines of cams 124 and followers 126. FIG. 9B shows Section B—B from FIG. 9A and position of cam 124—cam follower 126. FIG. 9B shows cam and cam follower in mid position. Relative relation between gears 106 and 116 at forced adjustment of effective tooth thickness produces axial movement over cams 124 on gear 116 and followers 126 on gear 106 to spring 120 deflection. Teeth of gears 106 and 116 are in constant contact with teeth of gear 104 for eliminating backlash in both directions of rotation.

Figure 10:
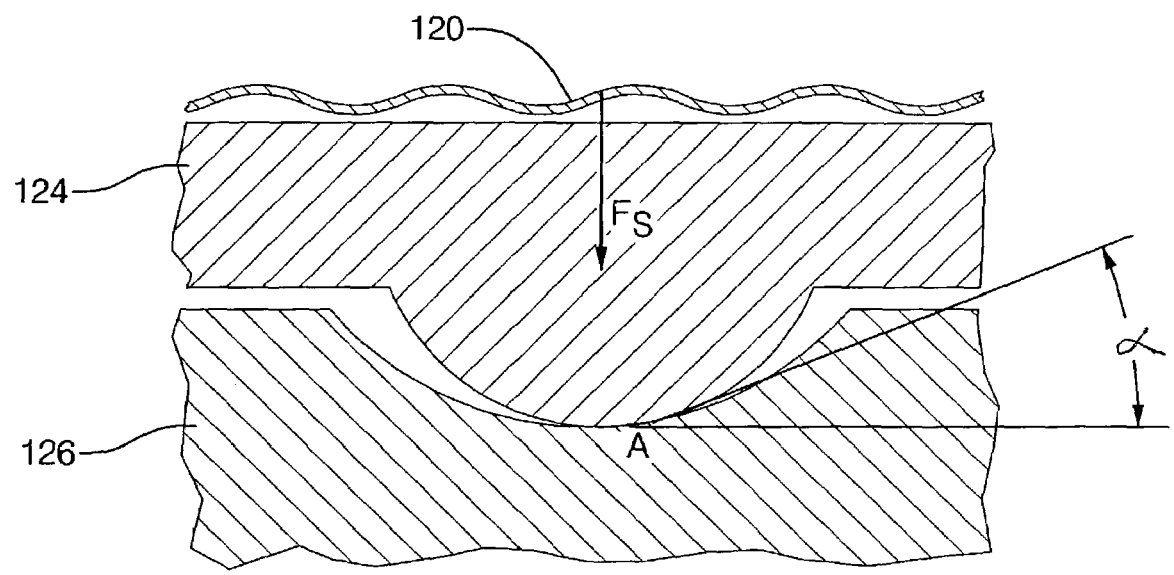
FIG. 10A is partial force diagram overlaid on FIG. 9B.
FIG. 10B is a force diagram of FIG. 10A.
Figure 10:
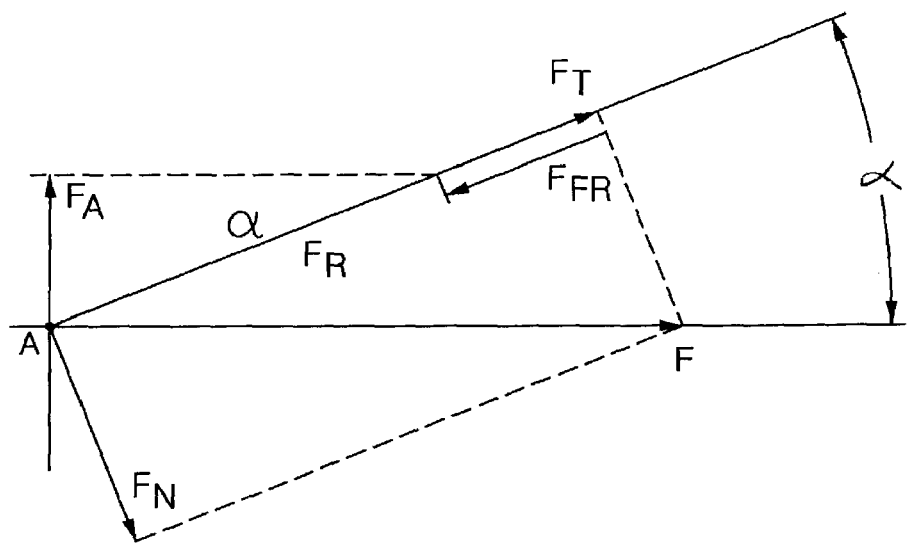

FIG. 10A shows cross-section through cam 124 and follower 126 abutting at point A and FIG. 10B shows a forces diagram at same point A. Force F is transmission load force which rotates gears at normal functional transmission load. Depending on tangential angle α spring force $F_S$ can be calculated, as shown below.

F=Transmission load
$F_T$=Tangential force
$F_N$=Normal force
$F_{FR}$=Friction force
$F_R$=Resultant tangential force
$F_S$=Spring Force
$F_A$=Axial force
$F_T$=F cosα
$F_N$=F sinα
$F_{FR}=F_N \mu$=F sinα $\mu$
$F_R=F_T-F_{FR}$
$F_R$=F cosα−F sinα $\mu$
$F_R$=F(cosα−$\mu$ sinα)
$F_A=F_R$ sinα
$F_A$=F sinα (cosα−$\mu$sinα)
$F_S \geq F_A$ $F_A$ force is resultant force in axial direction. For regular transmission load for rotation in both direction without lash, spring force needs to be equal or slightly bigger than axial force $F_A$. At bigger transmission load, spring forces are smaller and spring has small deflection. Thus, the system is adjustable.

FIGS. 11A–11D show backlash eliminator 150, usable in a gear assembly 100, with preloaded elastic element 152, shown in FIGS. 11B and 11D, suitable for relatively smaller forces and usable as an alternate to the cam and cam follower embodiment described above. The space between the legs of the elastic element 152 provides for adjustment. The elastic element 152 may include a substantially U-shaped body including a pair of legs 158 and 160, and a connecting portion 162. A slot 164 may exist between the legs 158, 160 with a rounded basin 166 at the end of the slot adjacent the connecting portion 162. Depending on transmission load, the backlash eliminator 150 may have more or less elastic parts, such as two as shown in FIG. 11A or one as shown in FIG. 11C. Gears 154 and 156 have relative position moved for angle θ. Teeth of gears 154 and 156 make contact without backlash. Spring forces are same or slightly bigger than load transmission force. The elastic elements 152 are capable of small deflection, angularly, for adjustment, whereas the spring 120 of FIGS. 8 and 10A deflect and permit axially moving. FIG. 1C shows integration of elastic element 152 with key for assembled shaft 108 and gears 154 and 156. FIG. 11D shows how the leg 158 may be sized smaller than the leg 160 so that the leg 160 may hold gear 156 onto shaft 108, while leg 152 may be elastically preloaded and make scissors of gears 154 and 156 and permitting deflection. While steel spring is preferable, alternate spring materials for different mechanisms and different uses are within the scope of this embodiment.

Figure 11:
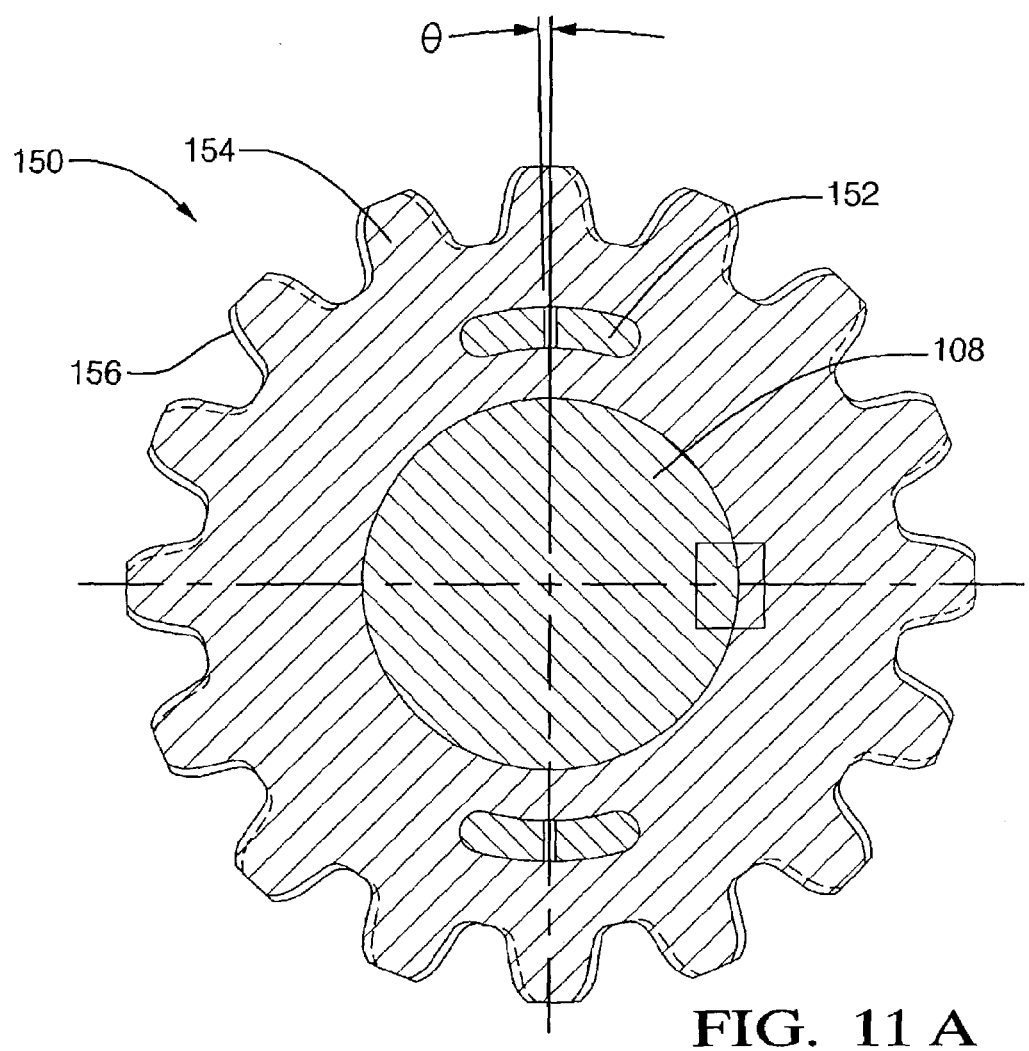
FIG. 11A is a cross-sectional view of a backlash eliminator including elastic elements.
FIG. 11B is a cross-sectional view of the backlash eliminator and elastic element of FIG. 11A.
FIG. 11C is a cross-sectional view of an alternate backlash eliminator.
FIG. 11D is a perspective view of an elastic element for use in the backlash eliminator of FIG. 11C.
Figure 11:
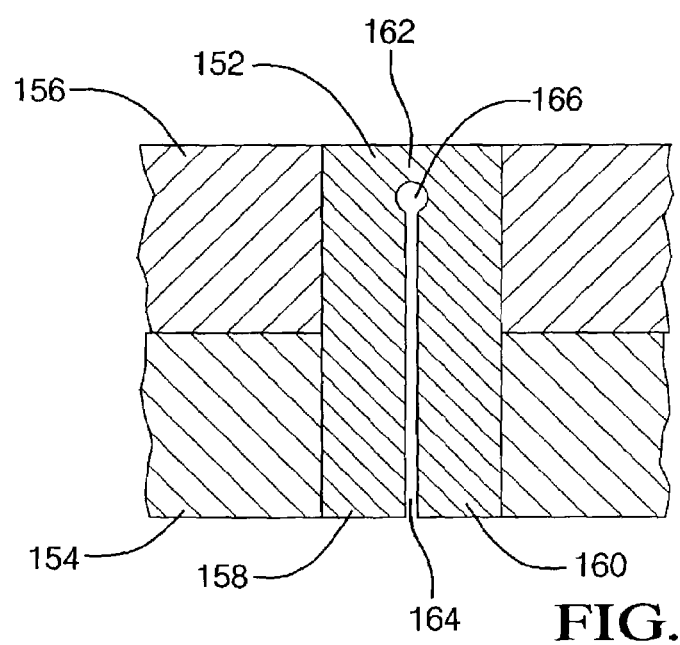
Figure 11:
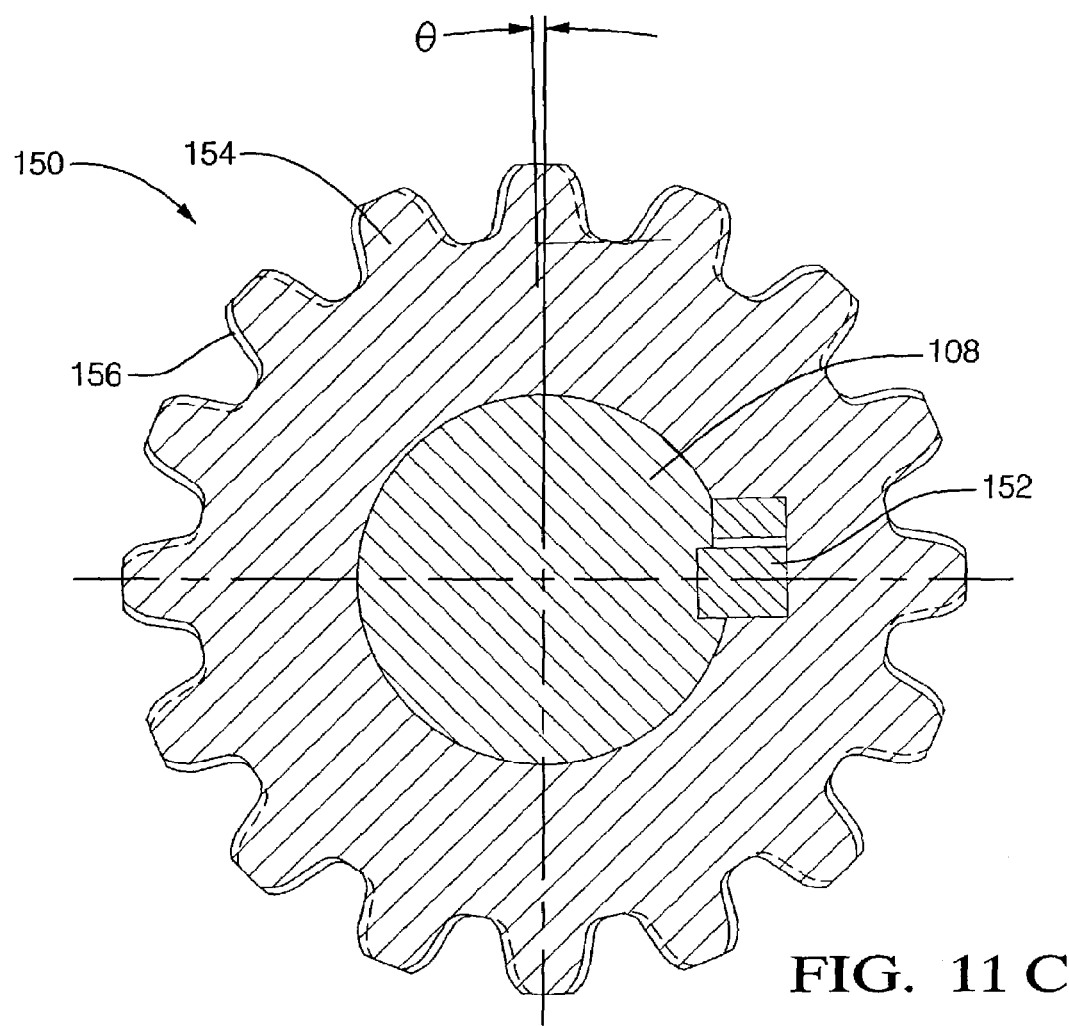
Figure 11:
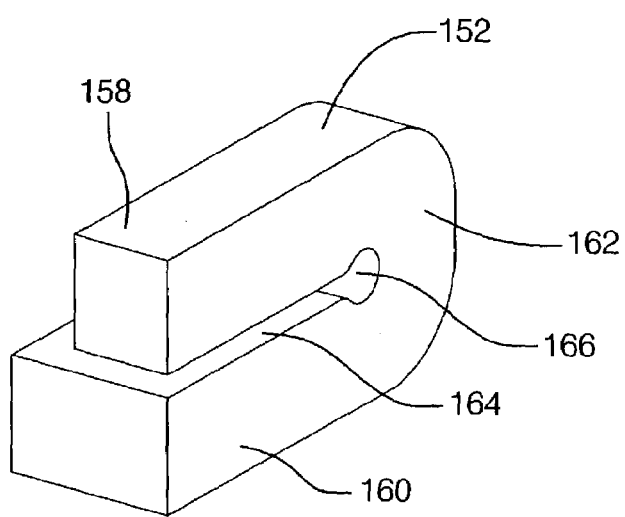
Figure 12:
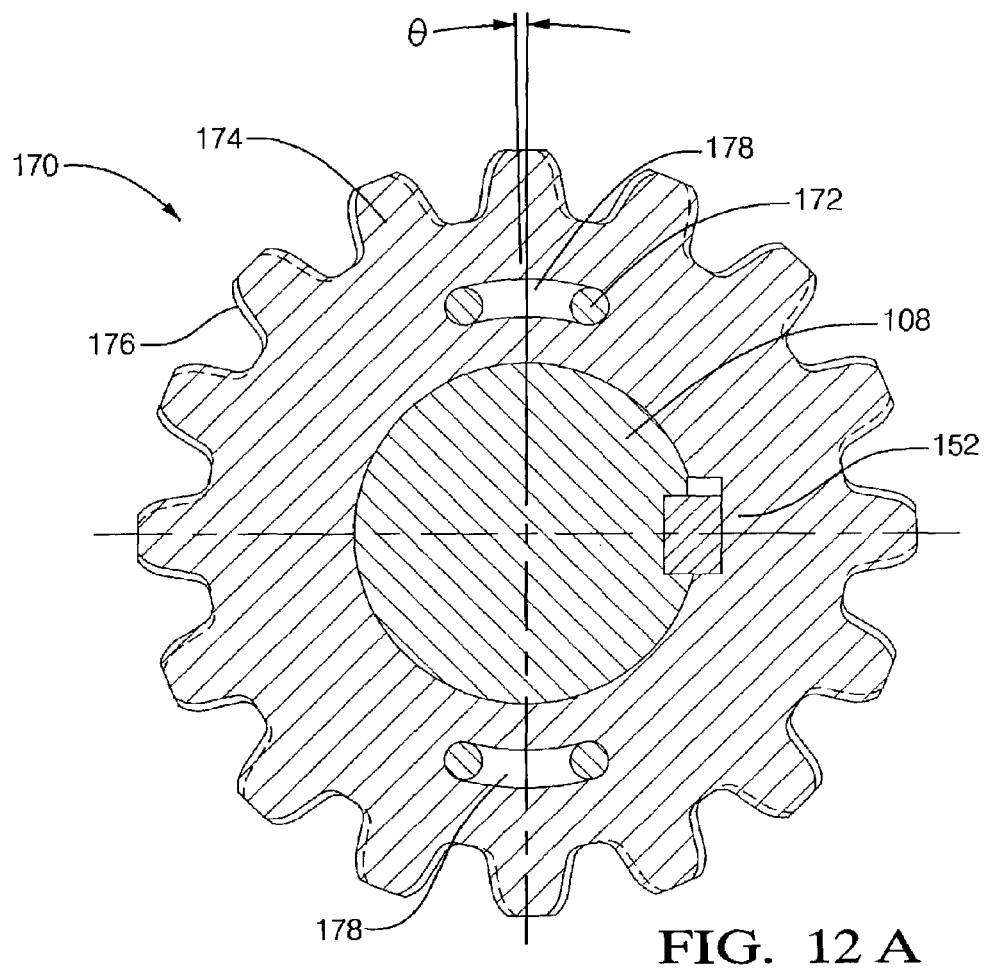
FIG. 12A is a cross-sectional view of an alternate backlash eliminator including spring wire.
FIG. 12B is a cross-sectional view of one embodiment of the spring wire for use in the backlash eliminator of FIG. 12A.
FIG. 12C is a cross-sectional view of another embodiment of the spring wire for use in the backlash eliminator of FIG. 12A.
FIG. 12D is a cross-sectional view of another embodiment of the spring wire for use in the backlash eliminator of FIG. 12A.
Figure 12:
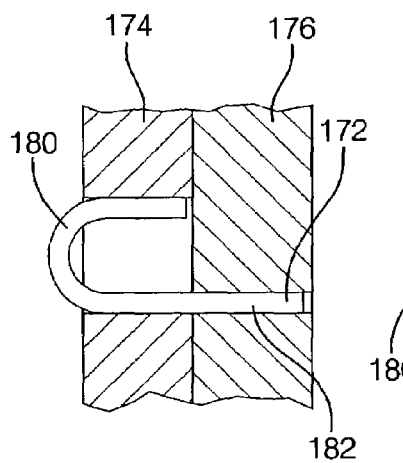
Figure 12:
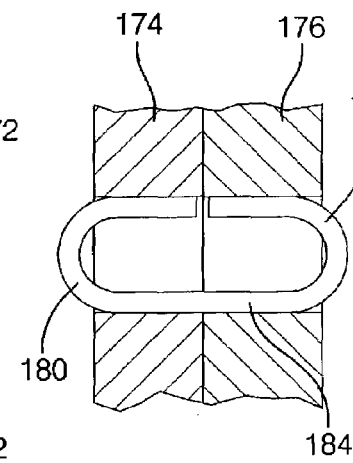
Figure 12:
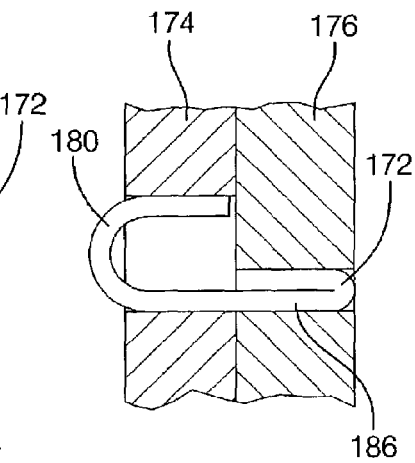

FIG. 12 shows an alternate backlash eliminator 170 for eliminating backlash similar to the backlash eliminator 150 shown in FIG. 11. Instead of elastic elements 152, however, the backlash eliminator 170 employs different shaped spring wire 172 which are preloaded and hold gears 174 and 176 moved for angle θ. Gear 174 (and gear 176 in the embodiment of FIG. 12C) may include an arcuate opening 178 or openings 178 (depending on how many wires 172 are incorporated) for receiving the wire 172. FIG. 12B shows the wire 172 having a U-shaped portion 180 passing through the gear 174 and a leg extension 182 passing through the gear 176. FIG. 12C shows the wire 172 having the U-shaped portion 180 passing through the gear 174 and an additional U-shaped portion 184 extending from the U-shaped portion 180 and passing through the gear 176. FIG. 12D shows the U-shaped portion 180 passing through the gear 174 and a folded over leg extension 186 passing through the gear 176.

Preloaded spring makes scissors to contact on both sides with gear (not shown) what is in mesh. For possible higher resistance of rotation, spring will be deflected and permit rotation. The differences between FIGS. 11 and 12 include mainly the shapes of the springs. The embodiments of FIGS. 11 and 12 are suitable for relatively smaller transmission forces.

Figure 13:
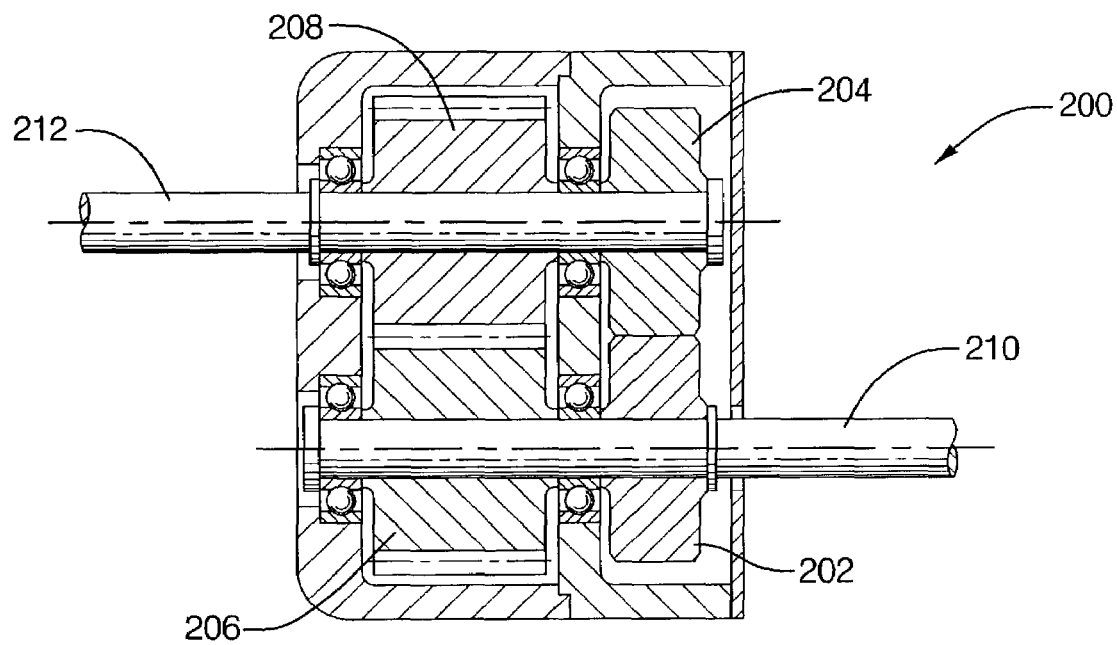
FIG. 13 is a cross-sectional view of a gear transmission including rollers.

FIG. 13 shows gear transmission 200 with backlash elimination with two rollers 202 and 204 which have same diameters as pitch diameters of gears 206 and 208. Gears 206 and 208 include teeth which mesh. Roller 202 and gear 206 are connected with and positioned about shaft 210. Roller 204 and gear 208 are connected with and positioned about shaft 212. It should be understood that rollers 202, 204 are annular shaped and do not include teeth and that gears 206 and 208 are annular shaped with teeth. Rollers 202, 204 rotate and over friction transmitted torque at beginning for amount of backlash and tooth contact. That is, rollers are in contact and have rotation, rolls, over constant contact and start friction transmission. When direction of rotation is changed, gears 206 and 208 would have backlash. For this lash, rollers cover this rotation, even slide, for improving feeling for amount of gear backlash when the gears start over teeth making transmission of rotation.

Figure 14:
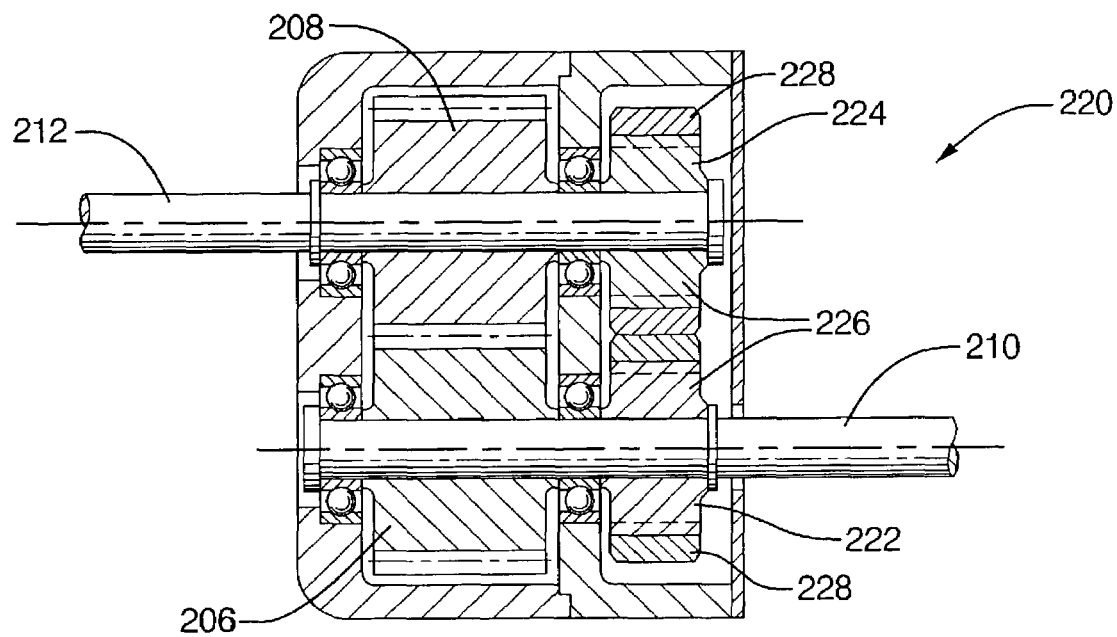
FIG. 14 is a cross-sectional view of a gear transmission including an alternate embodiment of rollers.

FIG. 14 shows a gear transmission 220 similar to the gear transmission 200 of FIG. 13. In the gear transmission 220, however, rollers 222 and 224 may be formed from steel 226 or other suitable metal or relatively undeflectable material vulcanized or assembled with rubber 228, plastic, or other suitable elastic material on an outer periphery. Rubber permits constant contact and small deflection. It is also within the scope of this gear transmission to make one roller from metal and a second roller from an elastic element or a combination of an elastic element and a metal.

Figure 15:
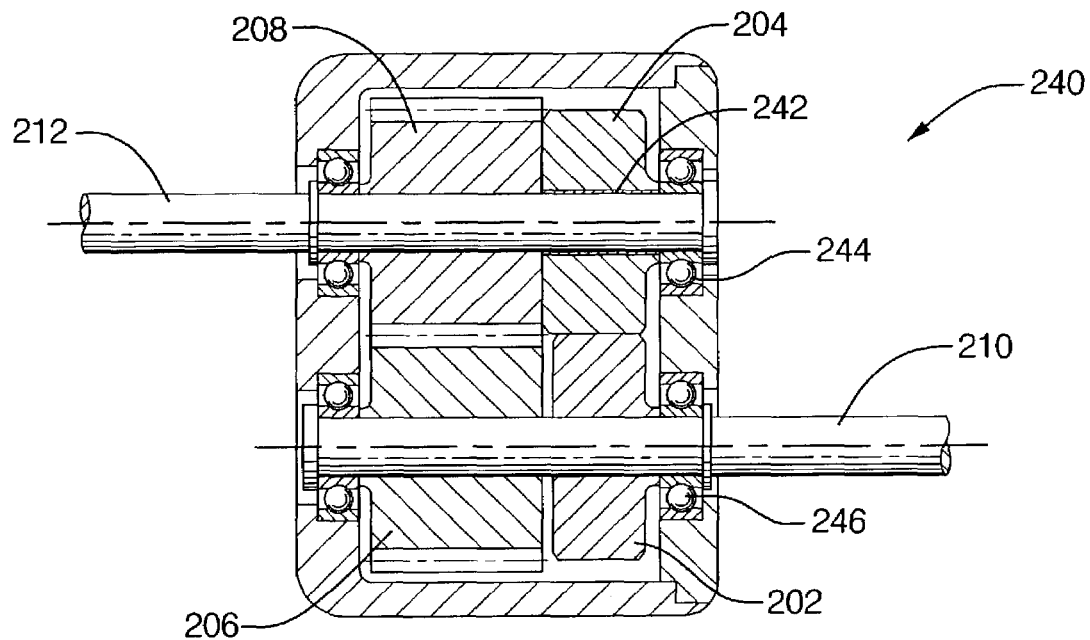
FIG. 15A is a cross-sectional view of a gear transmission including rollers and a tolerance ring.
FIG. 15B is a cross-sectional view of an alternate gear transmission including rollers and a tolerance ring.
Figure 15:
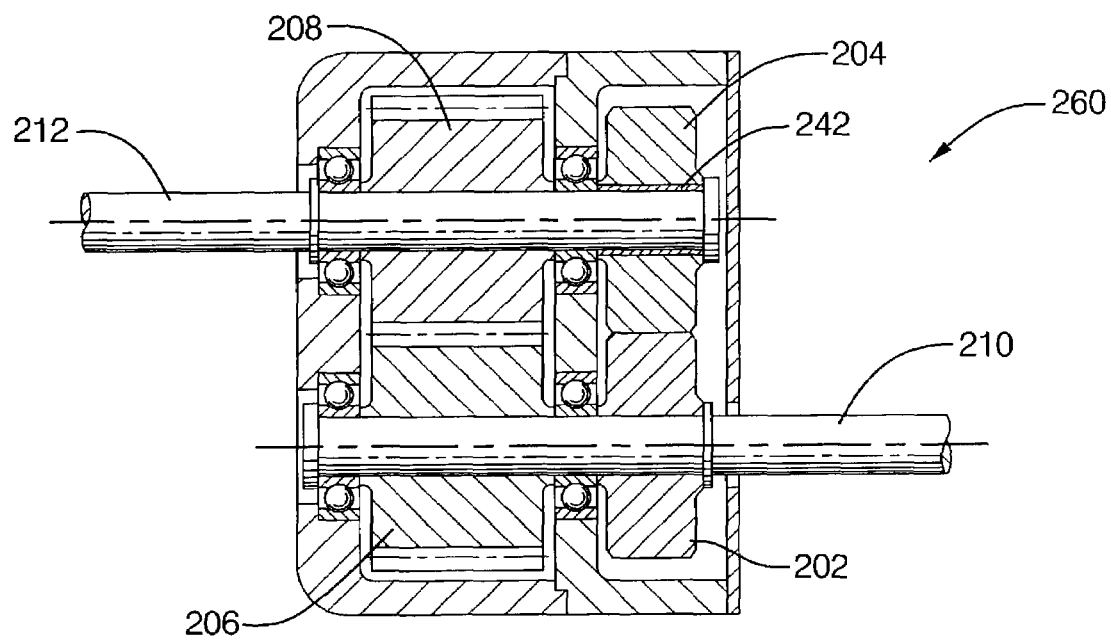

FIGS. 15A and 15B show load dependent embodiments of a gear transmission. FIG. 15A shows gear transmission 240 designed for smaller load and has possibility for greasing due to the positioning of the bearings 244, 246 on an exterior side of the rollers, as opposed to between the rollers and the gears as in FIGS. 13, 14, and 15B. Coefficient of friction is also smaller. In both FIGS. 15A and 15B, a tolerance ring 242 is installed between the shaft 212 and the roller 204, for covering wider tolerances, and permitting deflection. The tolerance ring 242 is preferably an elastic element, similar to spring 26 from FIGS. 1 and 2 but without the spline. During assembly between shaft 212 and roller 204, the tolerance ring 242 is preloaded and holds shaft 212 and roller 204 together over pressure that produces friction. This pressure produces friction between rollers 202 and 204 for rotation. For extremely higher resistance of rotation, the tolerance ring 242 can have more deflection. FIG. 15B shows a gear transmission 260 designed for larger loads and including the tolerance ring 242 as described above.

Figure 16:
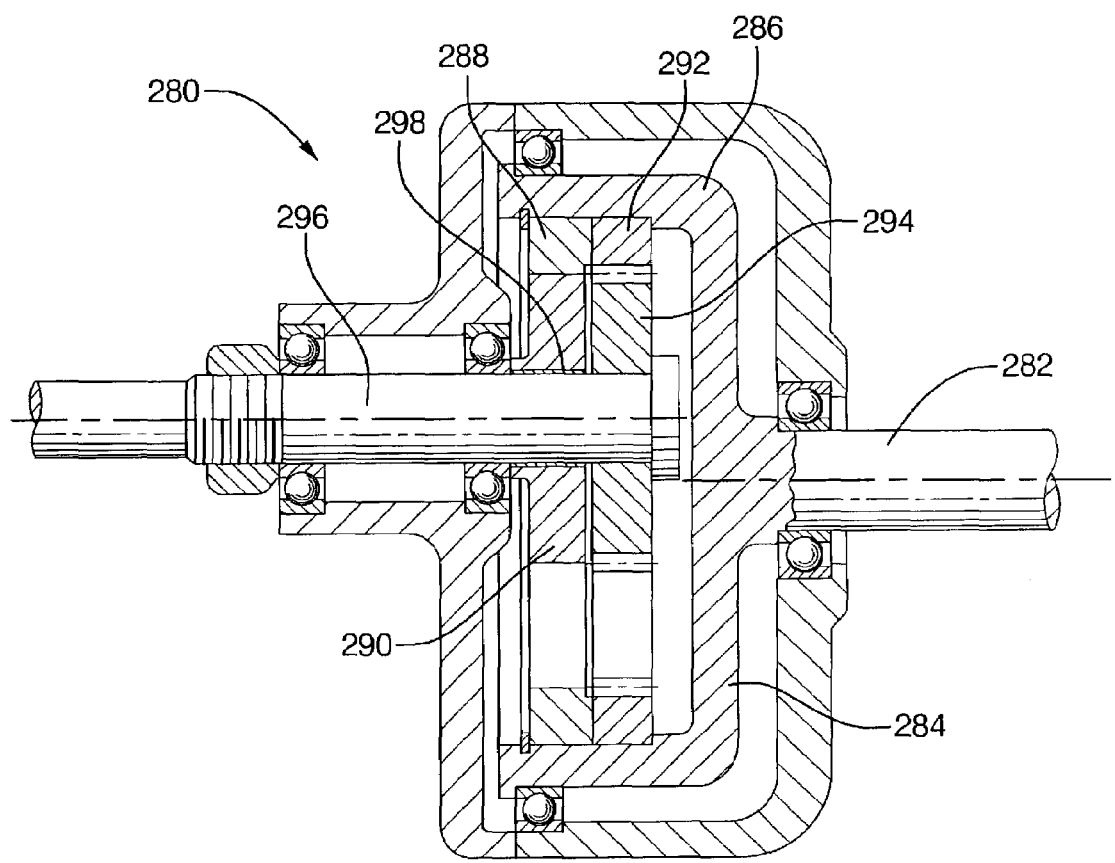
FIG. 16 is a cross-sectional view of a gear transmission having internal and external gears and rollers.

FIG. 16 shows a gear transmission 280 having a shaft 282 which forks into a cup-shaped element of which two sides 284 and 286 are shown for connecting to an internal roller 288 as well as internal gear 292. The shaft 282 turns into a cup-shaped element. Internal gear 292 is assembled into the cup-shaped element. The shaft 282 and gear 292 may be integrated into one piece. An external roller 290 is mounted within internal roller 288 and an external gear 294 is mounted within internal gear 292. The external roller 290 and the external gear 294 are mounted about shaft 296. It should be understood that rollers 288, 290, and gears 292, 294 are annular members. Also, internal gear 292 and internal roller 288 are concentric with centerline of shaft 282 and external gear 294 and external roller 290 are concentric with centerline of shaft 296. Rotation of shaft 282 may translate motion to internal gear 292, external gear 294, and then shaft 296. A tolerance ring 298 may be mounted between the shaft 296 and the external roller 290.

Another embodiment for backlash removal is by self adjusting conical contact which provides for gear backlash adjustable elimination with constant contact between conical elements under preloaded spring achieving optimum between backlash elimination and friction.

Figure 17:
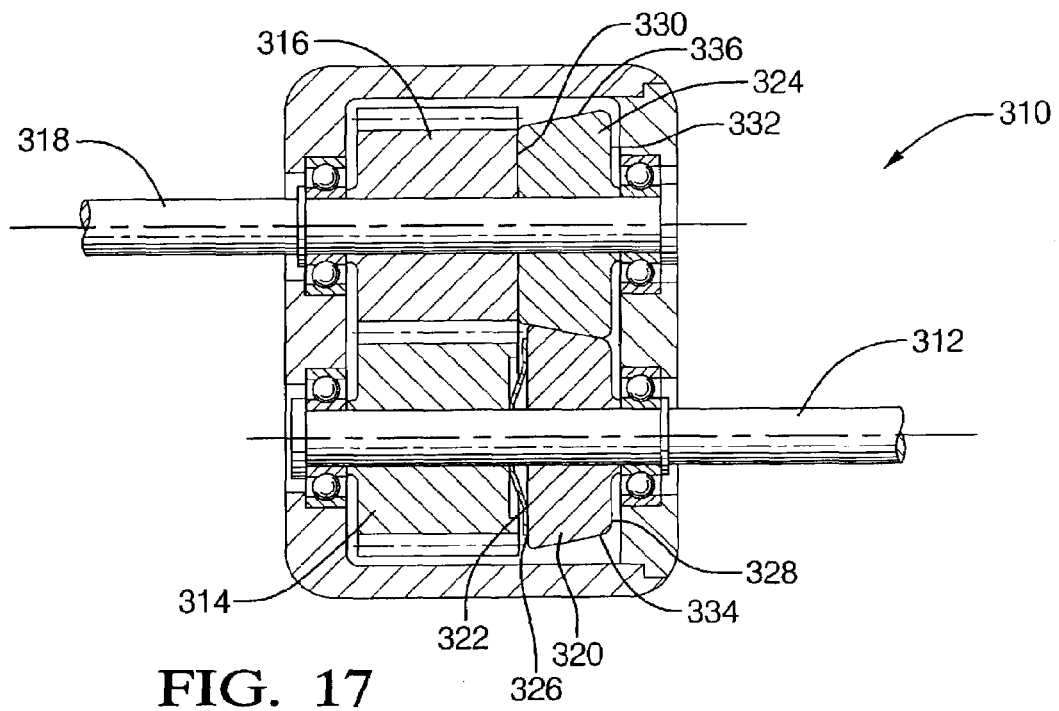
FIG. 17 is a cross-sectional view of a gear mechanism having conical elements as rollers.

FIG. 17 shows an adjustable backlash gear mechanism 310. At shaft 312 is connected gear 314 which transmits rotation over gear 316 to shaft 318. At shaft 312 is conical element 320 which is capable of small axial movement. That is, conical element 320 may be connected with shaft 312 over key or spline that permits axial movement of conical element 320 toward spring 322. Conical element 320 is supported by preloaded spring 322, such as a disc spring, positioned between the gear 314 and the conical element 320. Conical element 320 is in constant contact with conical element 324. By "conical element", it should be noted that the actual shape of elements 320, 324 are truncated conical annular shapes as clearly shown in the cross-sectional drawing of gear mechanism 310. During gear rotation, conical elements 320, 324 rotate together with gears 314, 316 and shafts 312, 318. When rotation changes direction, there is backlash between the teeth in the gears 314, 316. The conical elements 320, 324 are in constant contact with friction and eliminate backlash. In the embodiment shown in FIG. 17, the plane 326 of conical element 320 facing the gear 314 is larger than plane 328. On the contrary, for conical element 324, the plane 330 facing the gear 316 is smaller than the plane 332. The conical angle between the plane 326 and cone wall 334 is preferably the same or about the same as the conical angle between the plane 332 and cone wall 336. The cone walls 334, 336 define abutting roller faces. Depending on the conical angle, spring force can be calculated to achieve optimum between friction of conical elements and backlash elimination.

Figure 18:
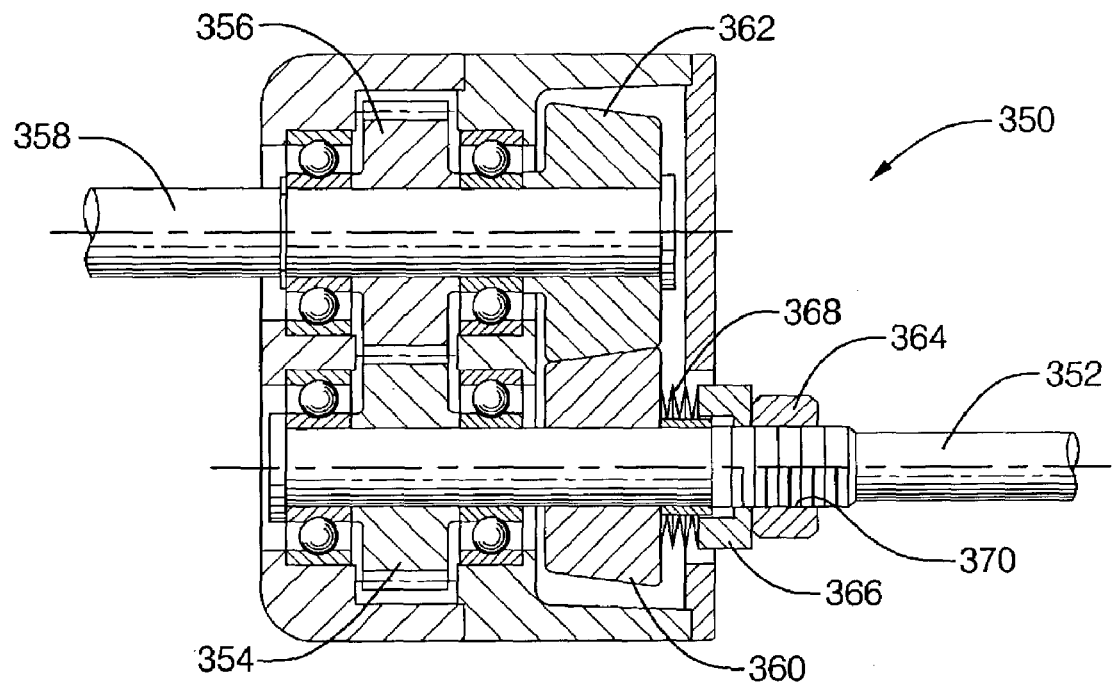
FIG. 18A is a cross-sectional view of a gear mechanism having an adjustable spring.
FIG. 18B is a cross-sectional view of a gear mechanism having an alternate placement of the adjustable spring.
Figure 18:
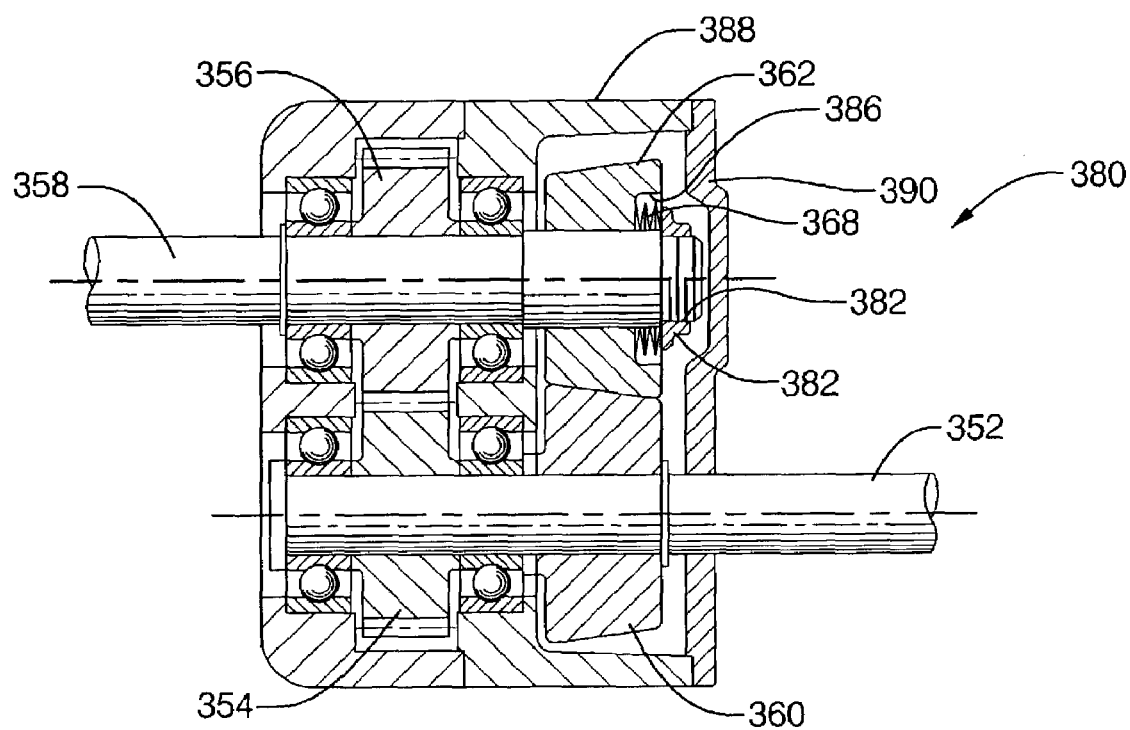

FIG. 18A shows an adjustable backlash gear mechanism 350 with capability for manual adjustment. At shaft 352 is connected gear 354 which rotates gear 356 and shaft 358. On shaft 352 is assembled conical element 360 which is capable of axial movement. By conical element, it should again be understood that "conical element" refers to the truncated conical annular shape shown in cross-section in the drawings. Conical element 360 includes a face facing the gear 354 which is smaller than its opposing parallel face. Conical element 362 is connected on shaft 358. Over nut 364 and support 366 enables increased or decreased preload of spring 368. The shaft 352 may include an exteriorly threaded portion 370 for receiving the nut 364. Spring 368 pushes conical element 360 in constant contact with conical element 362 for achieving backlash elimination. By increasing spring load, gear backlash is decreased and friction of transmission is increased. This embodiment may be employed for fine adjustment of alternate gear assemblies. Also, the adjustment mechanism is positioned outside of the housing 372 of the mechanism 350 and outside of the wall 374 through which the shaft 352 passes. After adjustment, nut 364 can be fixed. Thus, tolerance of conical element and their center distance may not be as strong as two cylindrical elements. That is, conical adjustable embodiment includes the possibility for adjustment to friction forces and tolerances to achieve contact with axial movement, while cylindrical rollers must have a very fine tolerance for contact between rollers.

FIG. 18B is a modified version of the adjustable backlash gear mechanism 350 shown in FIG. 18B. The adjustable backlash gear mechanism 380 is similar to mechanism 350 but includes a different place of adjustment. That is, a nut 382 is positioned over an end of the shaft 358 for increasing or decreasing preload of spring 368 which is also positioned about shaft 358. The end of the shaft 358 may include external threads 384. The conical element 362 may include a recess 386 for receiving the spring 368. Also, the larger face of the conical element 362 may face the spring 368. It should be further noted that the nut 384 in this embodiment is enclosed within gear mechanism housing 388 behind wall 390 through which the shaft 352 passes.

Figure 19:
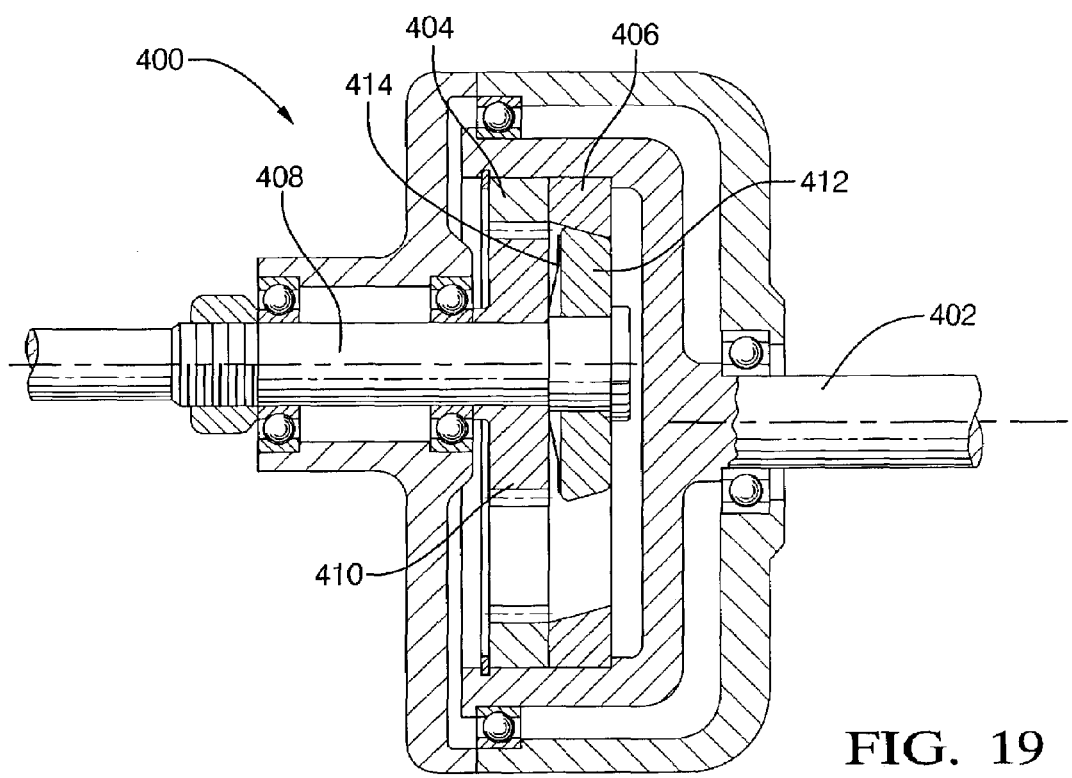
FIG. 19 is a cross-sectional view of a gear mechanism having internal and external gears and conical elements.

FIG. 19 shows an adjustable backlash gear mechanism 400 including an internal gear, similar to mechanism 280 shown in FIG. 16. Inside shaft 402 is connected to internal gear 404 and conical element 406. On shaft 408 is connected gear 410. At shaft 408 is conical element 412 which is capable of axial adjustment under preloaded spring 414. Conical elements 406 and 412 are in constant contact and rotate together with gears 404 and 410 and shafts 402 and 408. For backlash at gears 404 and 410, conical elements 406, 412 eliminate this backlash over friction from spring 414. Spring force is dependent on conical angle of conical elements 406, 412.

Figure 20:
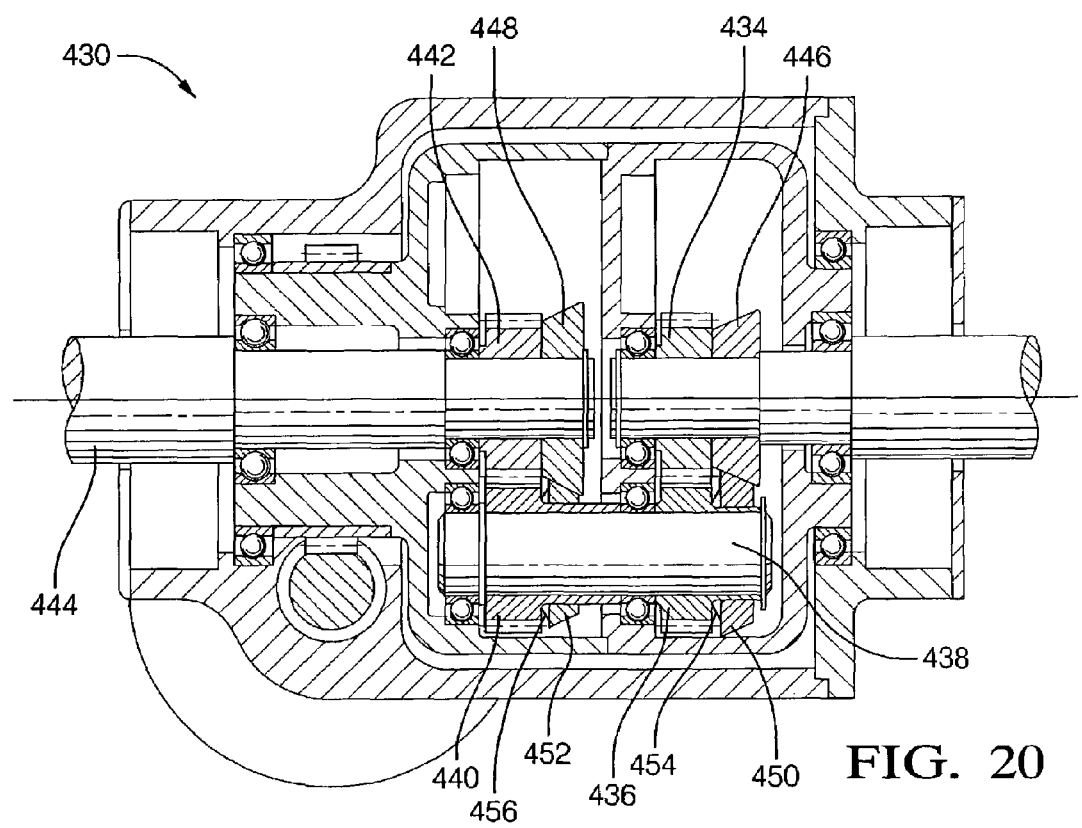
FIG. 20 is a cross-sectional view of a gear mechanism including planetary gears and conical elements; and, FIG. 21 is a cross-sectional view of a steering column.

FIG. 20 shows an adjustable backlash gear mechanism incorporated with planetary gears in an active front control steering mechanism 430. The adjustable backlash gear mechanism shown in FIG. 20 may be integrated in alternate planetary or other types of gear transmission. At shaft 432 is connected gear 434 which rotates planetary gear 436, planetary shaft 438, planetary gear 440, gear 442, and shaft 444. At shaft 432 is connected conical element 446. At shaft 444 is connected conical element 448. At planetary shaft 438 are conical elements 450 and 452 which are capable of axial movements. These conical elements 450, 452 are under preloaded springs 454 and 456. Conical elements 446 and 450 resolve backlash of gears 434 and 436. Conical elements 448 and 452 resolve problem backlash from gears 440 and 442.

Figure 21:
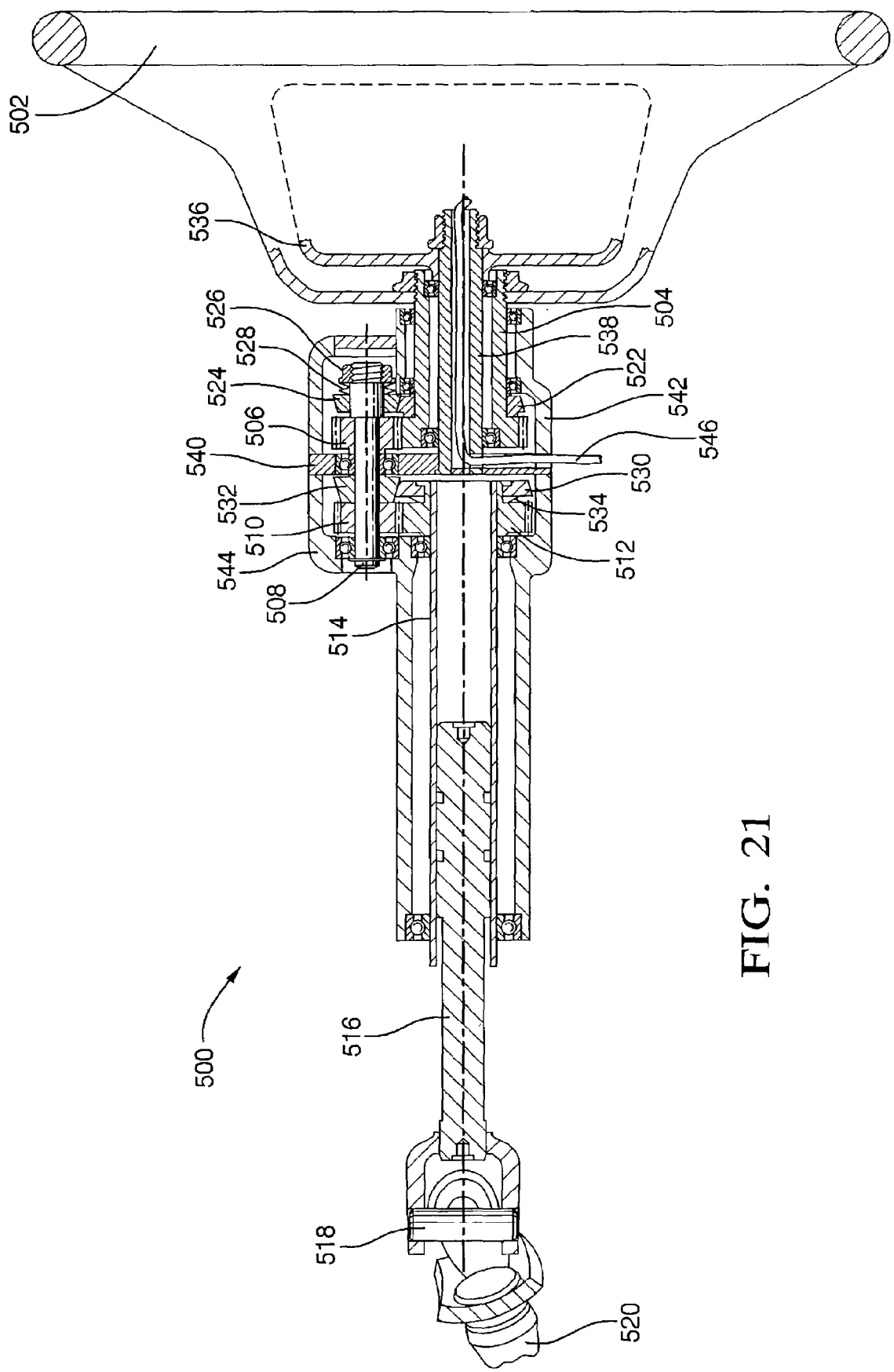

FIG. 21 shows steering column 500 with stationary wheel hub and conical adjustable gear backlash mechanism. When a driver rotates steering wheel 502, rotation is transferred to gear 504, gear 506, shaft 508, gear 510, gear 512, upper shaft 514, lower shaft 516, joint 518 to intermediate shaft 520. Backlash between gears 504 and 506 is eliminated over conical elements 522 and 524. Nut 526 with spring 528 may be adjusted for optimal contact between conical elements 522 and 524. Backlash between gears 510 and 512 is eliminated over conical elements 530 and 532. Preloaded spring 534 adjusts contact between the conical elements 530 and 532. Stationary hub 536, stationary shaft 538, over support 540 have connection with housings 542 and 544. Wire (cable) 546 is inside stationary shaft 538 and support 540.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A gear transmission for minimizing backlash, the gear transmission comprising:
    a first shaft;
    a first roller slidably positioned on the first shaft;
    a first gear positioned on the first shaft;
    a second shaft;
    a second roller positioned on the second shaft and adjacent the first roller; and, a second gear positioned on the second shaft and adjacent the first gear; wherein the first roller and the second roller abut when teeth of the first gear mesh with teeth of the second gear.

2. The gear transmission of claim 1 wherein the first roller includes an outer layer of an elastic material.

3. The gear transmission of claim 1 further comprising a tolerance ring installed between the second shaft and the second roller.

4. The gear transmission of claim 1 wherein the first roller and the second roller are truncated conically shaped rollers, wherein an outer conical face of the first roller rolls along an outer conical face of the second roller.

5. The gear transmission of claim 4 further comprising an adjustable spring on the first shaft, the adjustable spring adjusting an amount of force applied by the first roller onto the second roller.

6. The gear transmission of claim 5 further comprising a nut for adjusting and securing the spring in a selected position.

7. The gear transmission of claim 4 further comprising an adjustable spring on the second shaft adjacent the second roller, the adjustable spring adjusting an amount of force applied by the second roller onto the first roller, and further comprising a nut for adjusting and securing the spring in a selected position.

8. The gear transmission of claim 7 wherein the second roller includes a recess for receiving the spring.

9. The gear transmission of claim 4 wherein a conical angle of the first roller is substantially the same as a conical angle of the second roller.

10. The gear transmission of claim 1 further comprising a third shaft, a third roller positioned on the third shaft, a third gear positioned on the third shaft, a fourth roller positioned on the first shaft, and a fourth gear positioned on the fourth shaft, wherein roller faces of the third roller and the fourth roller abut when teeth of the third gear and the fourth gear mesh.

11. The gear transmission of claim 10 wherein the first roller, second roller, third roller, and fourth roller are truncated conically shaped.

12. The gear transmission of claim 1 wherein the first shaft has a cup shaped end, the first gear and the first roller positioned on the first shaft within the cup shaped end, the second gear positioned within the first gear and the second roller positioned within the first roller.

13. The gear transmission of claim 12 wherein the first roller and the second roller include truncated conically shaped roller faces which abut when teeth of the first gear and second gear mesh.

14. The gear transmission of claim 13 further comprising a spring positioned between the second roller and the second gear.

15. The gear transmission of claim 1 wherein a smaller diameter of the first roller is adjacent to a larger diameter of the second roller.

16. The gear transmission of claim 1 wherein the first shaft is parallel to the second shaft.

17. The gear transmission of claim 1 wherein a bearing is positioned on an exterior side of the first roller.

18. The gear transmission of claim 1 wherein a bearing is positioned on an exterior side of the second roller.

19. The gear transmission of claim 1 further comprising a bearing positioned between the first gear and the first roller.

20. The gear transmission of claim 1 further comprising a bearing positioned between the second gear and the second roller.

21. A gear transmission for minimizing backlash, the gear transmission comprising:
- a first shaft;
- a first roller positioned on the first shaft;
- a first gear positioned on the first shaft;
- a spring positioned between the first gear and the first roller;
- a second shaft;
- a second roller positioned on the second shaft and adjacent the first roller; and,
- a second gear positioned on the second shaft and adjacent the first gear; wherein the first roller and the second roller abut when teeth of the first gear mesh with teeth of the second gear.

22. The gear transmission of claim 21 wherein the first roller is capable of axial movement during operation.

23. The gear transmission of claim 21 wherein the spring is a disc spring.

* * * * *